(12) United States Patent
Vezina et al.

(10) Patent No.: US 10,526,045 B2
(45) Date of Patent: Jan. 7, 2020

(54) FRAME AND FRONT SUSPENSION ASSEMBLY FOR A SNOWMOBILE

(71) Applicant: BOMBARDIER RECREATIONAL PRODUCTS INC., Valcourt (CA)

(72) Inventors: Sebastien Vezina, Sherbrooke (CA); Jonathan Fortier, Lawrenceville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 247 days.

(21) Appl. No.: 15/470,188

(22) Filed: Mar. 27, 2017

(65) Prior Publication Data
US 2017/0341711 A1  Nov. 30, 2017

Related U.S. Application Data

(60) Provisional application No. 62/343,072, filed on May 30, 2016.

(51) Int. Cl.
*B62M 27/02* (2006.01)
*B60G 3/20* (2006.01)

(52) U.S. Cl.
CPC ............... *B62M 27/02* (2013.01); *B60G 3/20* (2013.01); *B60G 2200/144* (2013.01); *B60G 2300/322* (2013.01); *B62M 2027/023* (2013.01); *B62M 2027/026* (2013.01); *B62M 2027/028* (2013.01)

(58) Field of Classification Search
CPC ............ B62M 27/02; B62M 2027/026; B60G 2200/144
See application file for complete search history.

(56) References Cited

U.S. PATENT DOCUMENTS

| 6,446,744 | B2 | 9/2002 | Wubbolts et al. |
| 6,651,768 | B2 | 11/2003 | Fournier et al. |
| 6,866,110 | B2 | 3/2005 | Mallette et al. |
| 6,942,050 | B1 * | 9/2005 | Honkala ............. B62M 27/02 180/182 |
| 7,451,846 | B2 | 11/2008 | Wubbolts et al. |
| 7,469,794 | B2 | 12/2008 | Krueger |
| 7,753,154 | B2 | 7/2010 | Maltais |

(Continued)

OTHER PUBLICATIONS

Bombardier Recreational Products Inc.; SKI-DOO-2007 Shop Manual REV Series; 2006; Cover pages, pp. 575-592 and last page; Valcourt; Canada.

*Primary Examiner* — Tony H Winner
(74) *Attorney, Agent, or Firm* — BCF LLP

(57) ABSTRACT

A snowmobile has a frame having a motor module, a tunnel connected to the motor module, a suspension module connected to the motor module, a motor, a handlebar, a ski operatively connected to the handlebar and a front suspension assembly operatively connecting the ski to the suspension module and to the motor module. The front suspension assembly has a suspension arm having a proximal end positioned longitudinally between the motor module and the suspension module. The proximal end pivots about a pivot axis extending through an interior portion of the suspension module. A proximal fastener passes through the proximal end of the suspension arm and extends from the interior portion of the suspension module to the motor module. The proximal fastener thereby pivotally connects the suspension arm to the suspension module and to the motor module about the pivot axis.

18 Claims, 34 Drawing Sheets

(56) References Cited

U.S. PATENT DOCUMENTS

| | | | |
|---|---|---|---|
| 7,997,372 B2 | 8/2011 | Maltais | |
| 8,074,759 B2 | 12/2011 | Rasidescu et al. | |
| 8,490,731 B2 * | 7/2013 | Eaton | B60K 28/00 |
| | | | 180/190 |
| 8,733,773 B2 | 5/2014 | Sampson | |
| 8,944,204 B2 | 2/2015 | Ripley et al. | |
| 2013/0032418 A1 * | 2/2013 | Ripley | B62M 27/02 |
| | | | 180/190 |
| 2013/0175106 A1 * | 7/2013 | Bedard | B62M 27/02 |
| | | | 180/190 |
| 2016/0023716 A1 * | 1/2016 | Ripley | B62M 27/02 |
| | | | 280/834 |
| 2016/0200397 A1 * | 7/2016 | Vezina | B62M 27/02 |
| | | | 180/193 |
| 2017/0341710 A1 * | 11/2017 | Vezina | B62M 27/02 |

* cited by examiner

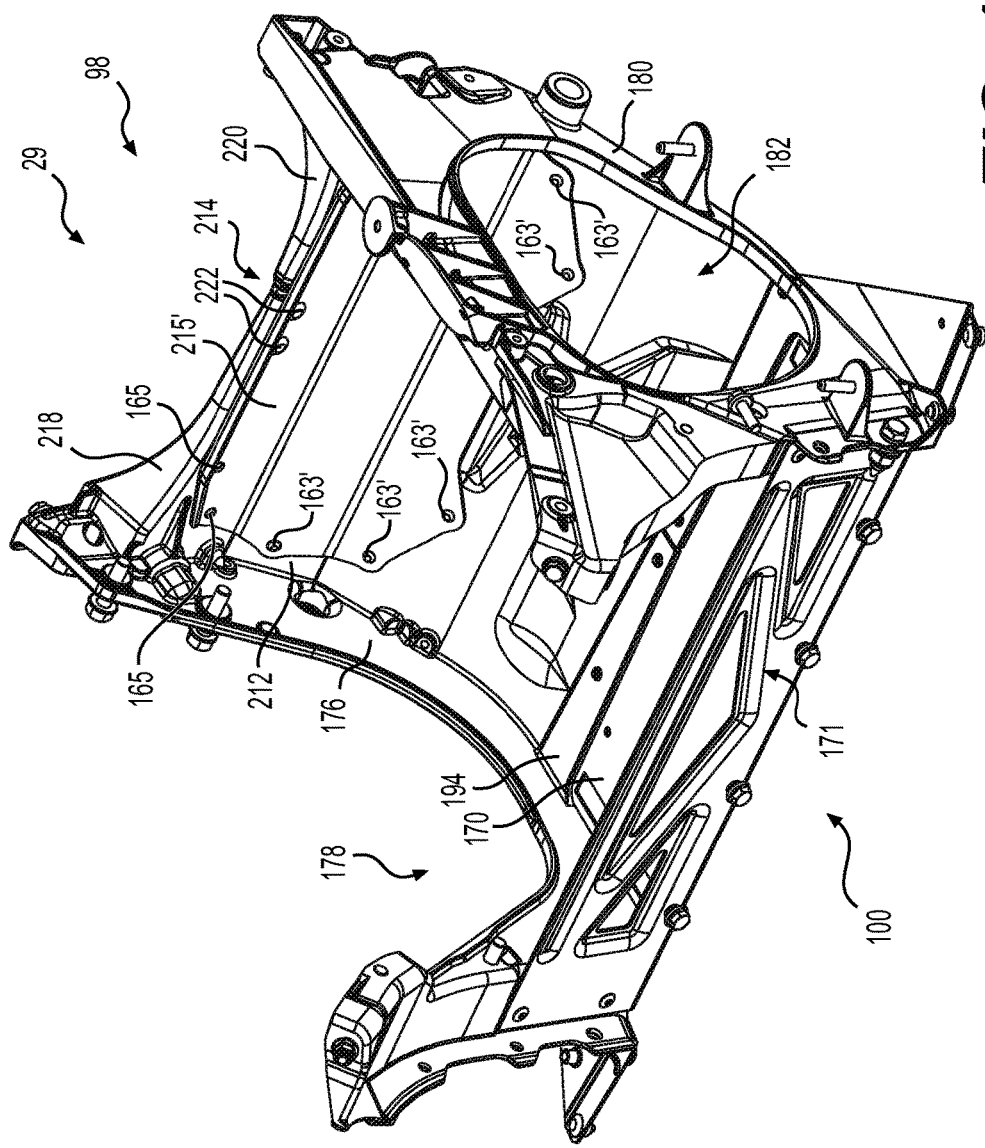

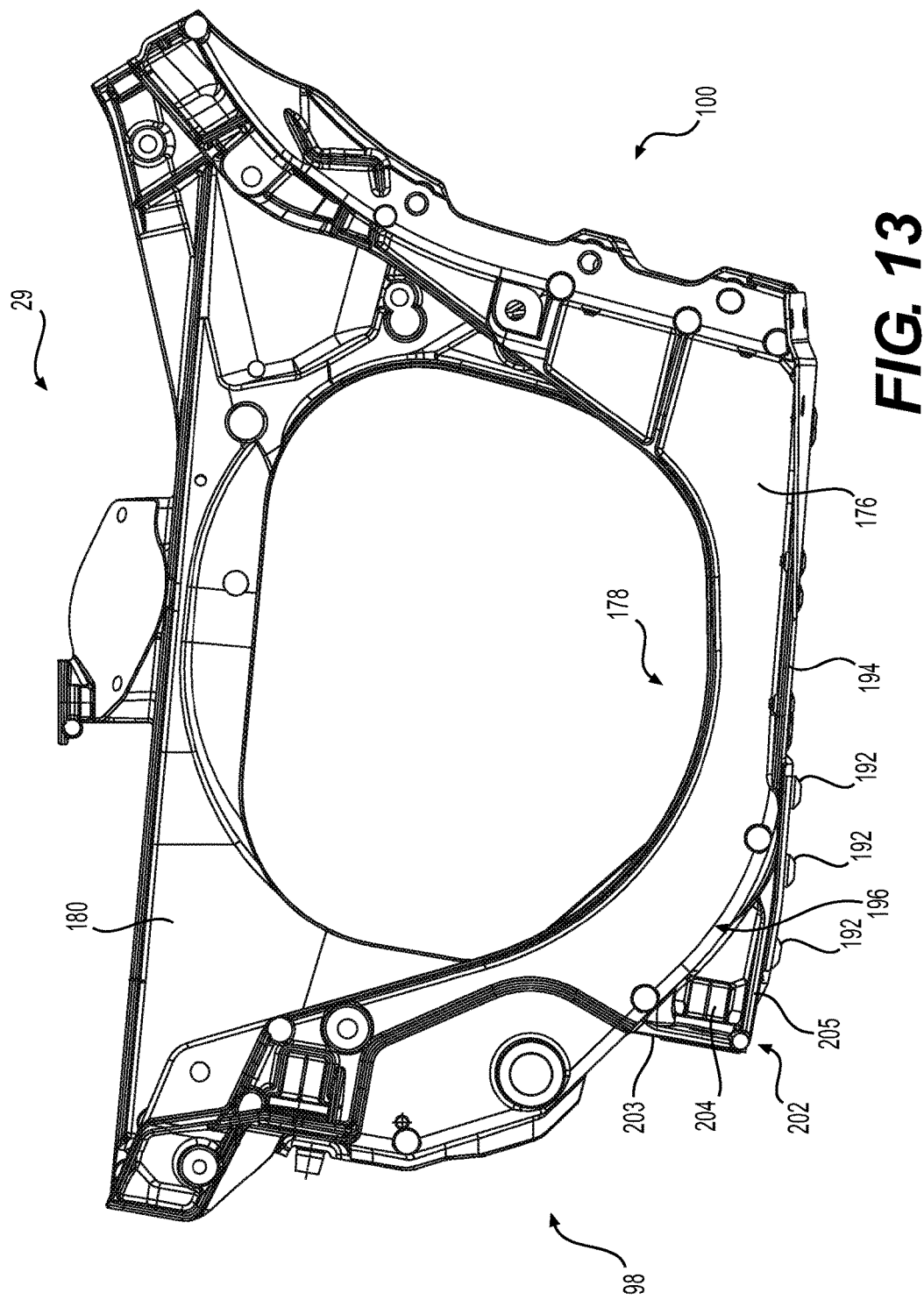

FRAME AND FRONT SUSPENSION ASSEMBLY FOR A SNOWMOBILE

CROSS-REFERENCE

The present application claims priority to U.S. Provisional Patent Application No. 62/343,072, filed May 30, 2016, the entirety of which is incorporated herein by reference.

TECHNICAL FIELD

The present technology relates to the construction of snowmobiles. More specifically, the present technology relates to the construction of frames and front suspension assemblies for snowmobiles.

BACKGROUND

The frame of a snowmobile typically includes a suspension module in a front portion of the frame for connecting a front suspension assembly between the skis and the frame, a motor module connected at the rear of the suspension module for receiving the motor of the snowmobile, and a tunnel connected at the rear of the motor module for connecting an endless track to the frame.

In some snowmobiles, the front suspension assembly is only connected to the suspension module, which is common when the front suspension assembly includes upper and lower suspension arms on both left and right sides. Such a construction is disclosed in U.S. Pat. No. 7,451,846 B2 for instance.

To withstand the forces encountered under normal operating conditions, the suspension module, the motor module and the tunnel and their respective parts are connected together using a plurality of fasteners and/or welds that adds significantly to the overall weight of the snowmobile. The manufacturing costs and complexity of the frame also increase as the number of fasteners and/or welds goes up.

Other components, such as cross members extending across the suspension module and/or the motor module, are sometimes provided to allow the suspension module and/or the motor module to withstand the forces applied to the frame by the suspension assemblies when the snowmobile travels through snow or when the skis impact the ground or other objects. These additional components further increase the weight of the snowmobile, its complexity, and its manufacturing costs.

Therefore, there is a desire for a frame and suspension assemblies for a snowmobile that address at least some of the inconveniences of the prior art.

SUMMARY

For the purposes of the present application, terms related to spatial orientation such as forward, rearward, front, rear, upper, lower are as they would normally be understood by a rider of the snowmobile sitting thereon in a normal driving position with the snowmobile being upright and steered in a straight ahead direction. In addition, the term "proximal" refers to items or components that are positioned closer to a longitudinal centerline than items or components that are qualified as "distal".

According to one aspect of the present technology, there is provided a snowmobile having a frame including a motor module, a tunnel connected to the motor module, and a suspension module connected to the motor module. The suspension module has an interior portion. The snowmobile further has a motor received in the motor module, a handlebar connected to the frame, a ski operatively connected to the handlebar, an endless drive track operatively connected to the tunnel and to the motor, a front suspension assembly connected to the suspension module and to the motor module, the front suspension assembly connecting the ski to the suspension module and to the motor module. The front suspension assembly includes a suspension arm having a proximal end positioned longitudinally between the motor module and the suspension module. The proximal end pivots about a pivot axis extending through the interior portion of the suspension module. The front suspension assembly includes a proximal fastener passing through the proximal end of the suspension arm and extending from the interior portion of the suspension module to the motor module, the proximal fastener thereby pivotally connecting the suspension arm to the suspension module and to the motor module about the pivot axis.

In some implementations, the motor module has a bracket provided on a bottom wall of the motor module. The bracket is adapted to receive a nut for fastening the proximal fastener thereto, and the proximal fastener is fastened to the nut.

In some implementations, the suspension module is forward of the motor module, the suspension arm includes a front member and a rear member, and the rear member has the proximal end.

In some implementations, the ski is a front left ski, the front suspension assembly is a front left suspension assembly, the front left ski is operatively connected to the suspension module and to the motor module via the front left suspension assembly, the suspension arm is a left suspension arm, the proximal end is a left proximal end, the pivot axis is a left pivot axis, and the proximal fastener is a left proximal fastener. The snowmobile further includes a front right suspension assembly and a front right ski operatively connected to the suspension module and to the motor module via the front right suspension assembly. The front right suspension assembly includes a right suspension arm having a right proximal end positioned longitudinally between the motor module and the suspension module, the right proximal end pivoting about a right pivot axis extending through the interior portion of the suspension module, and a right proximal fastener passing through the right proximal end of the right suspension arm and extending from the interior portion of the suspension module to the motor module, the right proximal fastener thereby pivotally connecting the right suspension arm to the suspension module and to the motor module about the right pivot axis.

In some implementations, a distance between the left and right pivot axes is less than twice an outside diameter of one of the left and right proximal ends.

In some implementations, the motor module has a bracket extending from a bottom wall of the motor module. The snowmobile further has a left nut received in the bracket, the left proximal fastener is fastened to the left nut, a right nut received in the bracket, and the right proximal fastener is fastened to the right nut.

In some implementations, the left suspension arm includes a front left member and a rear left member. The rear left member has the left proximal end, the right suspension arm includes a front right member and a rear right member, the rear right member has the right proximal end.

In some implementations, the snowmobile further includes a torsion bar assembly including a torsion bar extending across the interior portion of the suspension module, a left linkage connecting a left end of the torsion bar to the rear left member, and a right linkage connecting a right end of the torsion bar to the rear right member.

In some implementations, the snowmobile further has a left shock absorber assembly connected between the left suspension arm and the suspension module, and a right shock absorber assembly connected between the right suspension arm and the suspension module.

In some implementations, the left proximal end is a rear left proximal end. The left pivot axis is a rear left pivot axis. The left proximal fastener is a rear left proximal fastener. The front left member has a front left proximal end positioned below a front portion of the suspension module. The front left proximal end pivots about a front left pivot axis extending through the interior portion of the suspension module. The front left suspension assembly further includes a front left proximal fastener passing through the front left proximal end of the front left member and extending in the interior portion of the suspension module, the front left proximal fastener thereby pivotally connecting the front left member to the front portion of the suspension module. The right proximal end is a rear right proximal end. The right pivot axis is a rear right pivot axis. The right proximal fastener is a rear right proximal fastener. The front right member has a front right proximal end positioned below the front portion of the suspension module. The front right proximal end pivots about a front right pivot axis extending through the interior portion of the suspension module. The front right suspension assembly further includes a front right proximal fastener passing through the front right proximal end of the front right member and extending in the interior portion of the suspension module, the front right proximal fastener thereby pivotally connecting the front right member to the front portion of the suspension module.

In some implementations, a distance between the front left and right pivot axes is less than twice an outside diameter of one of the front left proximal end and the front right proximal end.

In some implementations, the left suspension arm is a lower left suspension arm. The front left suspension assembly further has an upper left suspension arm. The upper left suspension arm has upper front and rear left members. The upper left rear member has an upper left rear proximal end. The front left suspension assembly further has an upper left rear proximal fastener passing through the upper left rear proximal end and extending through the motor module, the upper left rear proximal fastener pivotally connecting the upper left rear member to the motor module. The right suspension arm is a lower right suspension arm. The front right suspension assembly further has an upper right suspension arm. The upper right suspension arm has upper front and rear right members. The upper right rear member has an upper right rear proximal end. The front right suspension assembly further has an upper right rear proximal fastener passing through the upper right rear proximal end and extending through the motor module, the upper right rear proximal fastener pivotally connecting the upper right rear member to the motor module.

In some implementations, the upper left front member has an upper left front proximal end. The front left suspension assembly further has an upper left front proximal fastener passing through the upper left front proximal end and extending through the suspension module, the upper left front proximal fastener pivotally connecting the upper left front member to the suspension module. The upper right front member has an upper right front proximal end. The front right suspension assembly further has an upper right front proximal fastener passing through the upper right front proximal end and extending through the suspension module, the upper right front proximal fastener pivotally connecting the upper right front member to the suspension module.

In some implementations, the suspension module includes a left part and a right part. The left and right parts are connected together.

In some implementations, the motor module includes a left part and a right part. The left and right parts are connected together using at least one of bonding and fastening.

In some implementations, the left and right parts of the motor module are cast parts.

In some implementations, the front and rear left pivot axes are coaxial. The front and rear right pivot axes are coaxial. The front and rear left pivot axes are parallel to the front and rear right pivot axes.

In some implementations, the bottom wall of the motor module has a convex bottom face. The bracket includes a vertical portion extending downwardly from the convex bottom face and perpendicularly to the left and right pivot axes. The bracket further includes a horizontal portion extending rearwardly and perpendicularly to the vertical portion.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 12C is a top, rear, right side perspective view of the motor module of FIG. 9 according to another variant having an alternative implementation of a plate connected thereto;

FIG. 13 is a left side elevation view of the motor module of FIG. 9;

DETAILED DESCRIPTION

Figure 1:
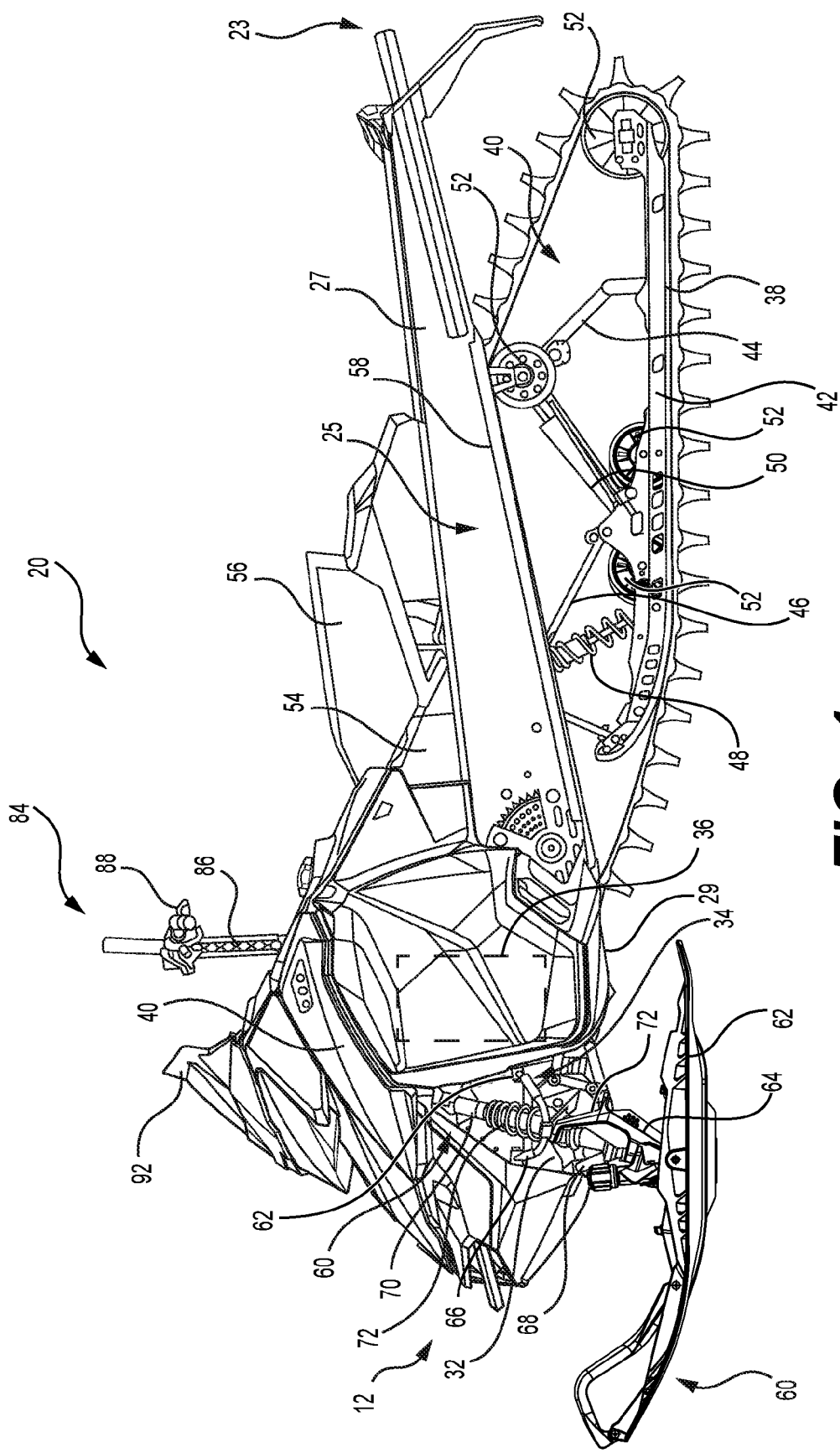
FIG. 1 is a left side elevation view of a snowmobile.
Figure 4:
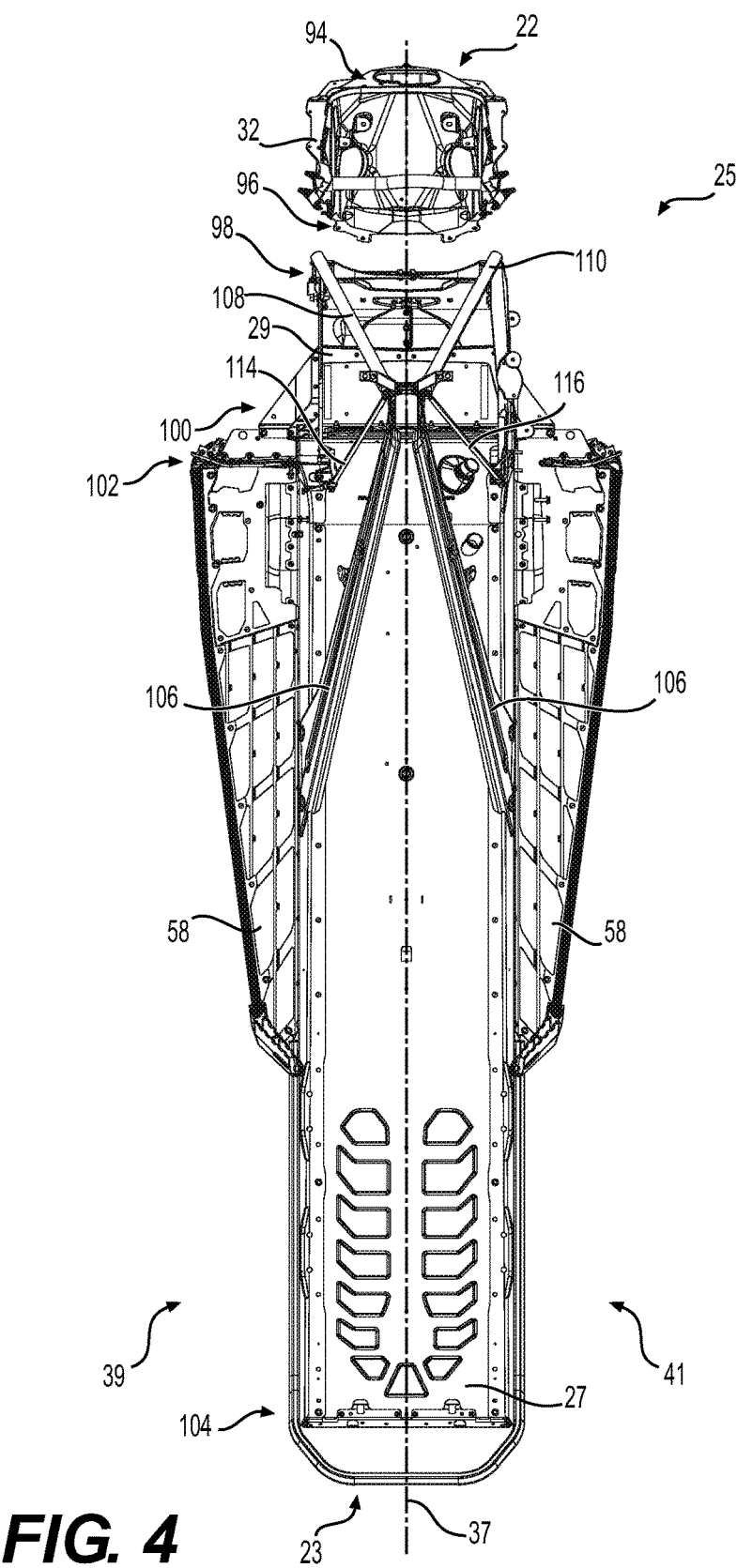
FIG. 4 is a top plan view of the frame of FIG. 2.
Figure 5:
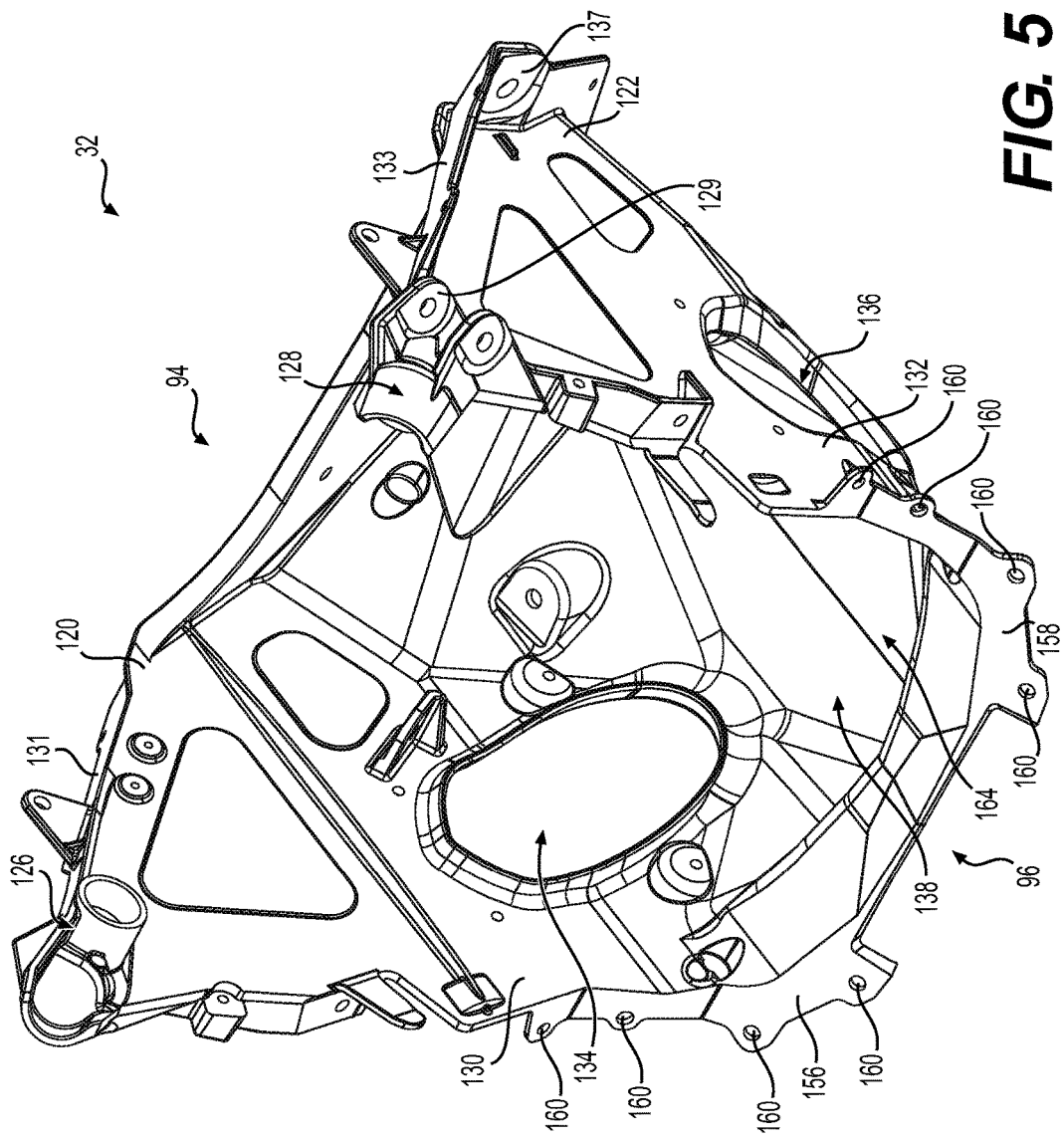
FIG. 5 is a top, rear, right side perspective view of the suspension module of FIG. 2.
Figure 24:
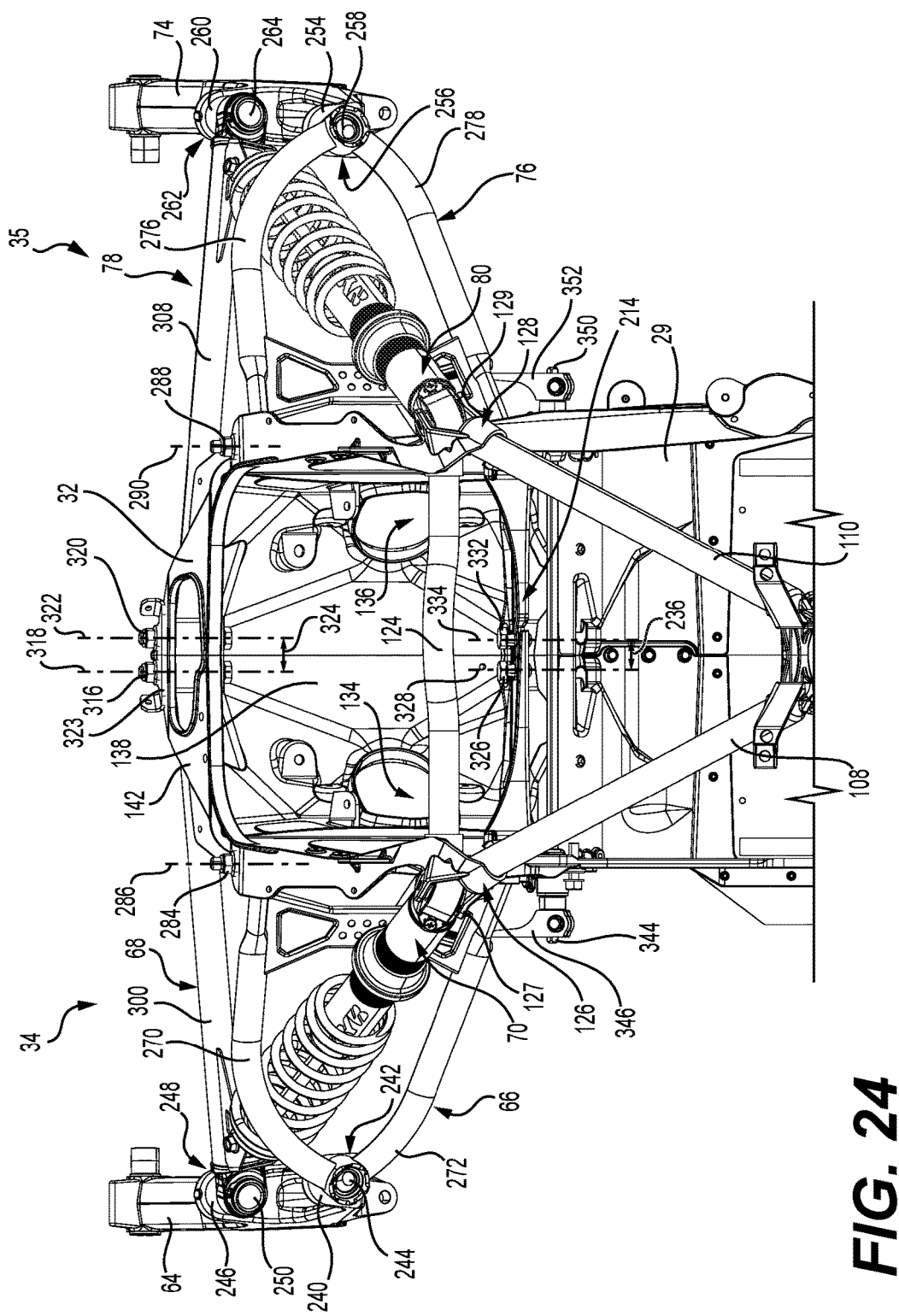
FIG. 24 is an enlarged view of the portion XXIV of the frame and front suspension assemblies of FIG. 23.

Referring to FIGS. 1, 4 and 24, a snowmobile 20 will be described. The snowmobile 20 has a front end 22 and a rear end 23, which are defined consistently with the forward travel direction of the snowmobile 20. The snowmobile 20 includes a frame 25. The frame 25 includes a tunnel 27, a motor module 29 and a suspension module 32. A longitudinal centerline 37 (FIG. 4) extends between the front end 22 and the rear end 23 of the snowmobile 20 and splits the frame 25 into a left longitudinal side 39 and a right longitudinal side 41. For the purpose of the present application, the components that are qualified as "left" or "right" are positioned on the corresponding left longitudinal side 39 and right longitudinal side 41 of the frame 25.

Figure 21:
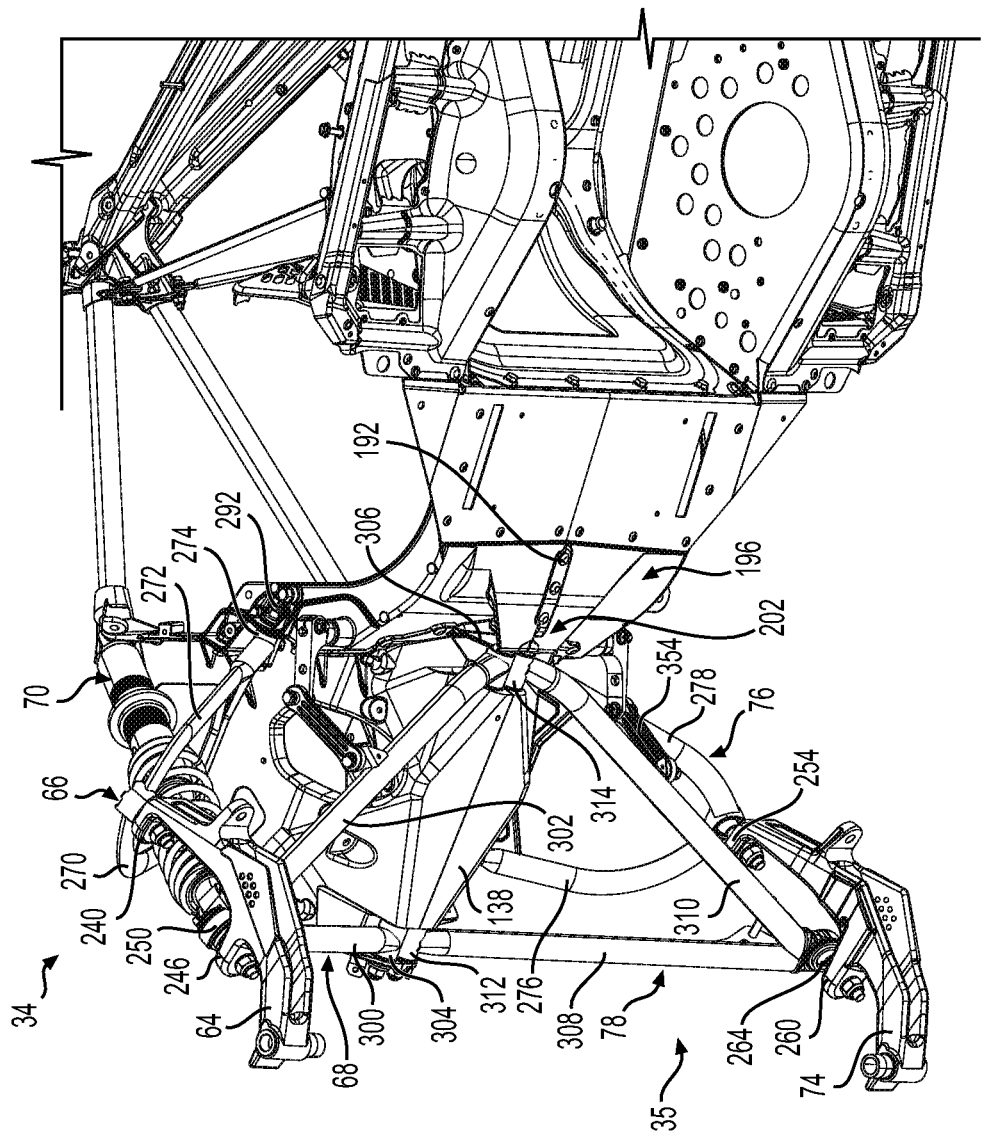
FIG. 21 is an enlarged view of the portion XXI of the frame of FIG. 20.

Front left and right suspension assemblies 34, 35 are connected to the suspension module 32 and to the motor module 29 (FIGS. 21 and 24). The connection of the front left and right suspension assemblies 34, 35 to the suspension module 32 and to the motor module 29 will be described in detail below. A motor 36, which is schematically illustrated in FIG. 1, is received in the motor module 29. In the present implementation, the motor 36 is a two-stroke, two-cylinder, internal combustion engine. However, it is contemplated that other types of motors could be used such as, but not limited to, an electric motor or a four-stroke internal combustion engine.

An endless drive track 38 is disposed under the tunnel 27. The endless drive track 38 is operatively connected to the engine 36 through a continuously variable transmission (CVT, not shown) and other components not described herein. The endless drive track 38 is suspended for movement relative to the frame 25, by a rear suspension assembly 40. The rear suspension assembly 40 includes a pair of spaced apart slide rails 42, rear suspension arms 44, 46 and shock absorbers 48, 50. The slide rails 42 engage the internal side of the endless drive track 38. The rear suspension arms 44, 46 and the shock absorbers 48, 50 pivotally connect the tunnel 27 to the slide rails 42. The endless drive track 38 is driven to run about the rear suspension assembly 40 for propulsion of the snowmobile 20. A plurality of wheels 52 define the path over which the endless drive track 38 travels.

A fuel tank 54 is supported on top of the tunnel 27. A seat 56 is disposed on the fuel tank 54 and is adapted to support a rider. Two footrests 58 (FIG. 4) are positioned on opposite sides of the tunnel 27 below the seat 56 to support the rider's feet. The footrests 58 are integrally formed with the tunnel 27.

A left ski assembly 60 is positioned at the front end 22 of the snowmobile 20. A right ski assembly (not shown) is also positioned at the front end 22 of the snowmobile 20. The right ski assembly is, in some implementations, a mirror image of the left ski assembly 60.

The left ski assembly 60 includes a left ski 62 and a corresponding left ski leg 64. The left ski assembly 60 is operatively connected to the suspension module 32 and to the motor module 29 via the front left suspension assembly 34. The front left suspension assembly 34 includes an upper left suspension arm 66, a lower left suspension arm 68 and a left shock absorber assembly 70. The left shock absorber assembly 70 includes a left spring 72.

Referring to FIGS. 1 and 24, the right ski assembly (shown in part) includes a right ski (not shown) and a right ski leg 74 connected to the suspension module 32 and to the motor module 29 via the front right suspension assembly 35. The front right suspension assembly 35 includes an upper right suspension arm 76, a lower right suspension arm 78, and a right shock absorber assembly 80. The right shock absorber assembly 80 includes a right spring 82.

The left and right ski legs 64, 74 are pivotally connected to the corresponding upper and lower suspension arms 66, 68, 76, 78 respectively, and the corresponding shock absorber assembly 70, 80 is connected between the corresponding lower suspension arms 68, 78 and the suspension module 32 of the frame 25.

Referring to FIG. 1, a steering assembly 84 including a steering column 86 and a handlebar 88 is supported by the frame 25. The steering column 86 is attached at its upper end to the handlebar 88, which is positioned forward of the seat 56. The steering column 86 is operatively connected to the ski legs 64, 74 by steering rods 72 in order to steer the left ski 62 and the right ski, and thereby the snowmobile 20, when the handlebar 88 is turned.

Fairings 90 enclose the engine 36 and the CVT, and provide an external shell that protects the engine 36 and the CVT. The fairings 90 include a hood and one or more side panels that can be opened to allow access to the engine 36 and the CVT when this is required, for inspection or maintenance of the engine 36 and/or the CVT for example. A windshield 92 is connected to the fairings 90 forward of the handlebar 88. It is contemplated that the windshield 92 could be attached directly to the handlebar 88.

Figure 2:
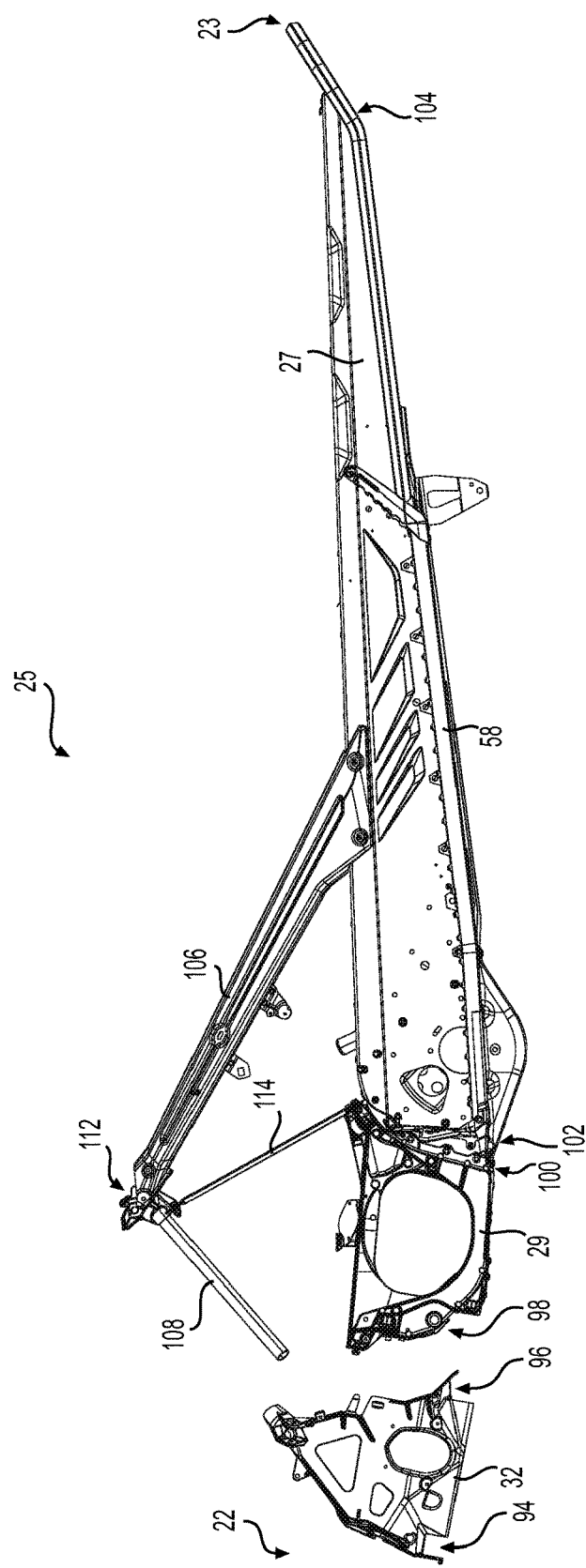
FIG. 2 is a left side elevation view of a frame of the snowmobile of FIG. 1, with a suspension module separated therefrom.
Figure 3:
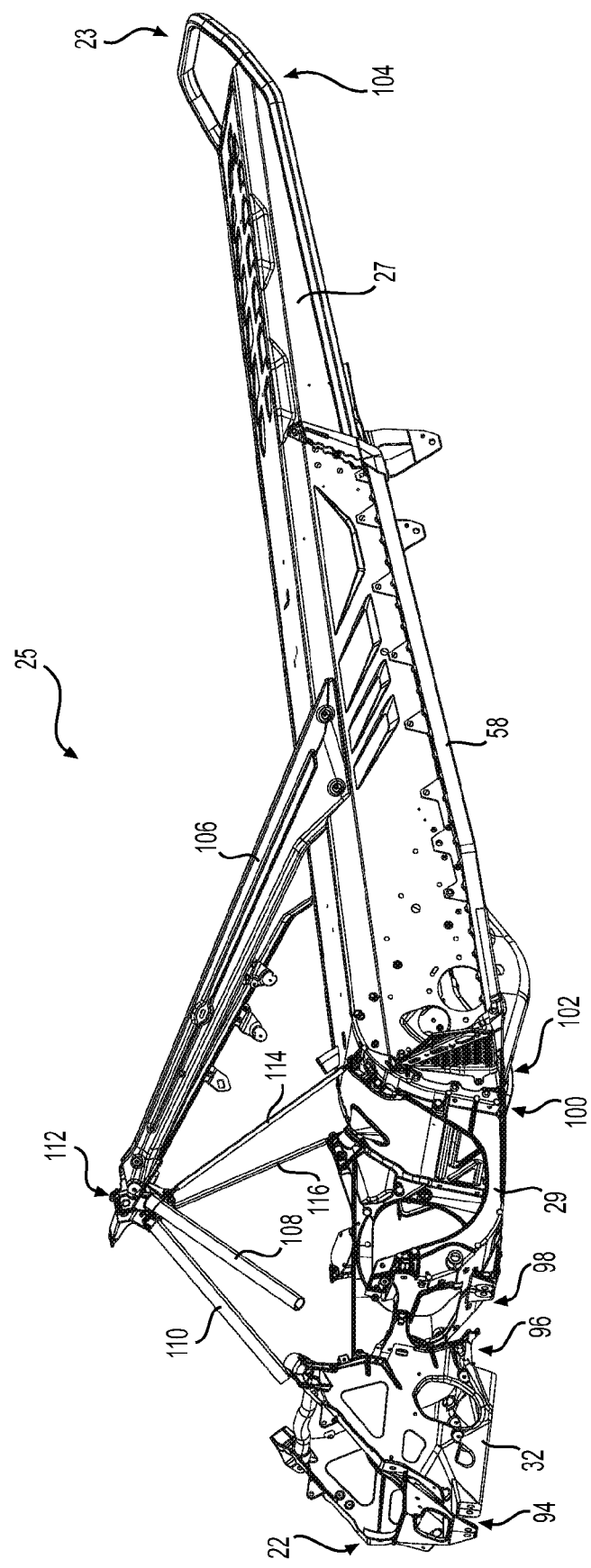
FIG. 3 is a front, left side perspective view of the frame of FIG. 2.

Referring to FIGS. 2 to 4, the frame 25 of the snowmobile 20 will be described in more detail. The suspension module 32 is disposed near the front end 22 of the snowmobile 20. The suspension module 32 has a front portion 94 and a rear portion 96. The motor module 29 is disposed rearward of the suspension module 32. The motor module 29 has a front portion 98 and a rear portion 100. The front portion 98 of the motor module 29 abuts the rear portion 96 of the suspension module 32. The connection between the motor module 29 and the suspension module 32 will be described in further detail below. The tunnel 27 is disposed rearward of the motor module 29. The tunnel 27 has a front portion 102 and a rear portion 104, the rear portion defining the rear end 23 of the snowmobile 20. The rear portion 100 of the motor module 29 may be connected to the front portion 102 of the tunnel 27 by any suitable means known in the art. For example, the motor module 29 may be welded or bolted to the tunnel 27. The tunnel 27 has rear frame members 106 connected to the tunnel 27 and extending to an apex 112 to which the steering column 86 is connected. Front left and right members 108, 110 are connected to the suspension module 32 and extend to the apex 112. Middle left and right members 114, 116 are connected between the apex 112 and the motor module 29.

Referring to FIGS. 5 to 8 and 24, the suspension module 32 will be described in more detail. The suspension module 32 includes left and right parts 120, 122. The left and right parts 120, 122 of the suspension module 32 are cast parts. Other manufacturing methods are also contemplated. The left and right parts 120, 122 are connected together using welding or any other suitable connection technique known in the art. The suspension module 32 also includes a crossbar 124 extending between an upper left portion 126 and an upper right portion 128 of the suspension module 32. The upper left portion 126 includes left tabs 127 for connecting the left shock absorber assembly 70 (FIG. 24), and the upper right portion 128 includes right tabs 129 for connecting the right shock absorber assembly 80 (FIG. 24). Below each upper portion 126, 128, the suspension module 32 has left and right side walls 130, 132. The left and right side walls 130, 132 have a respective aperture 134, 136 allowing passage of the left and right steering rods 72 (FIG. 1) connecting the steering column 86 to the ski legs 64, 74. Left and right upper flanges 131, 133 extend laterally from the left and right side walls 130, 132 and include left and right tabs 135, 137.

When the left and right parts 120, 122 of the suspension module 32 are connected, the suspension module 32 has a bottom wall 138 extending between the front portion 94 and the rear portion 96 of the suspension module 32. A drain hole 140 is defined in the bottom wall 138 to drain water from the suspension module 32.

Figure 12A:
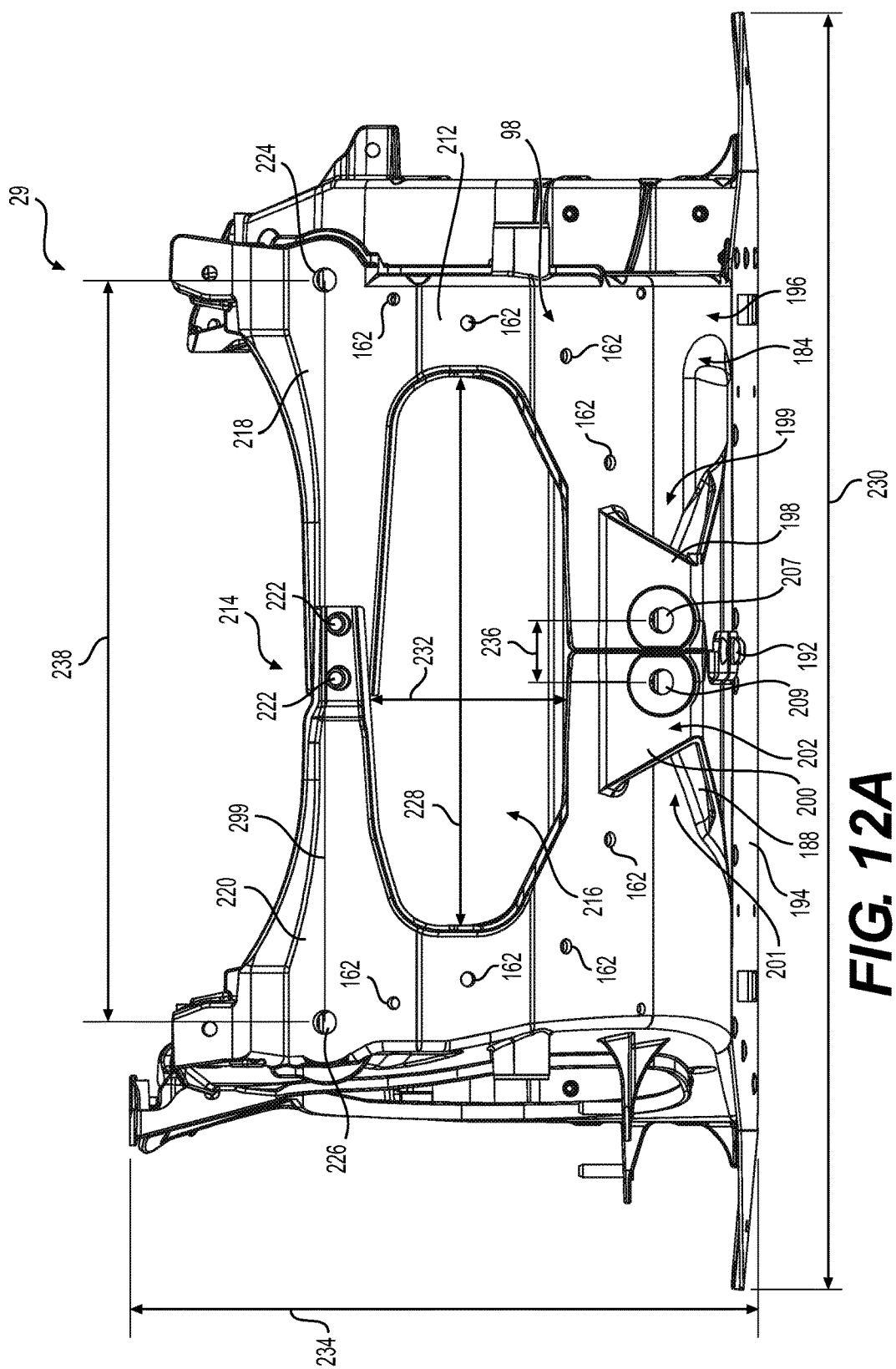
FIG. 12A is a front elevation view of the motor module of FIG. 9.

As illustrated in FIGS. 5 to 8 and 24, in the front portion 94, the suspension module 32 has a front wall 142 with an aperture 144 defined therein. Below the front wall 142, the suspension module 32 has lower front left and right tabs 146, 148. In the rear portion 96, the suspension module 32 has a rear wall 150 with left and right holes 152, 154 defined therein. The rear portion 96 also includes rear left and right flanges 156, 158 defining holes 160 allowing passage of fasteners (not shown) connecting the suspension module 32 to the motor module 29 as the motor module 29 has corresponding holes 162 defined on the front portion 98 of the motor module 29 (FIG. 12A). The suspension module 32 could also be connected to the motor module 29 using any other suitable technique known in the art, such as welding. The left and right side walls 130, 132, the front and rear walls 142, 150 and the bottom wall 138 define an interior portion 164 of the suspension module 32.

Referring to FIGS. 9 to 13, the motor module 29 will be described in more detail. The motor module 29 includes a bottom panel 170 and left and right parts 172, 174. The left and right parts 172, 174 are connected to the bottom panel 170 using fasteners (not shown). The left and right parts 172, 174 could be connected to the bottom panel 170 using any other suitable technique known in the art, such as bonding or welding. The left and right parts 172, 174 are cast parts while the bottom panel 170 is made from sheet metal. Other manufacturing techniques are also contemplated. At the rear portion 100 of the motor module 29, the bottom panel 170 has an upwardly extending portion 171 adapted to abut the front portion 102 of the tunnel 27 so that connection therebetween can be performed. The motor module 29 may be connected to the tunnel 27 by any suitable means known in the art. For example, the motor module 29 may be riveted to the tunnel 27.

The left part 172 defines a left side wall 176 of the motor module 29. The left side wall 176 defines a U-shaped recess 178 therein. The right part 174 defines a right side wall 180 of the motor module 29. The right side wall 180 has an aperture 182 defined therein.

Figure 10:
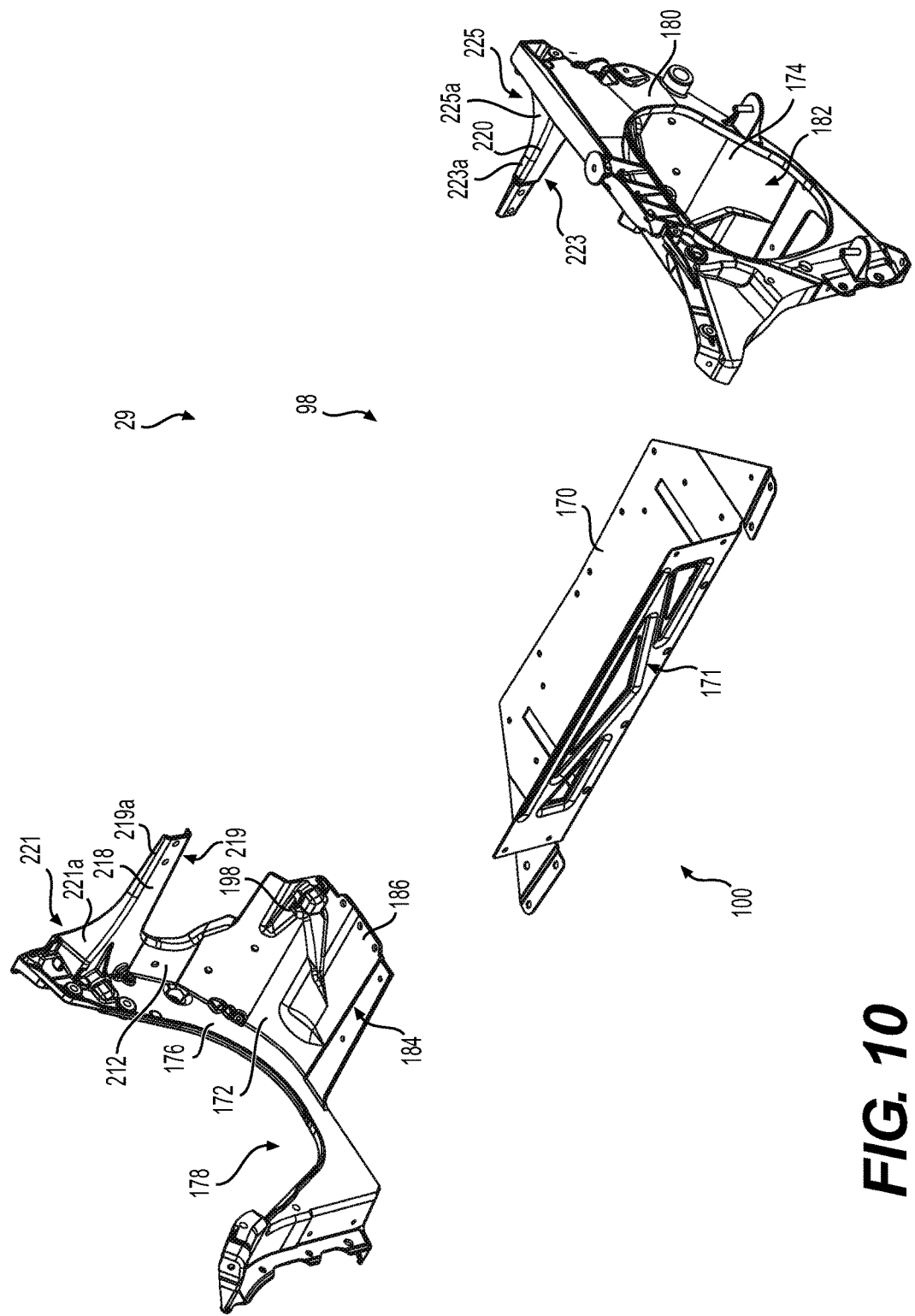
FIG. 10 is an exploded, top, rear, right side perspective view of the motor module of FIG. 9, with fasteners omitted.
Figure 11:
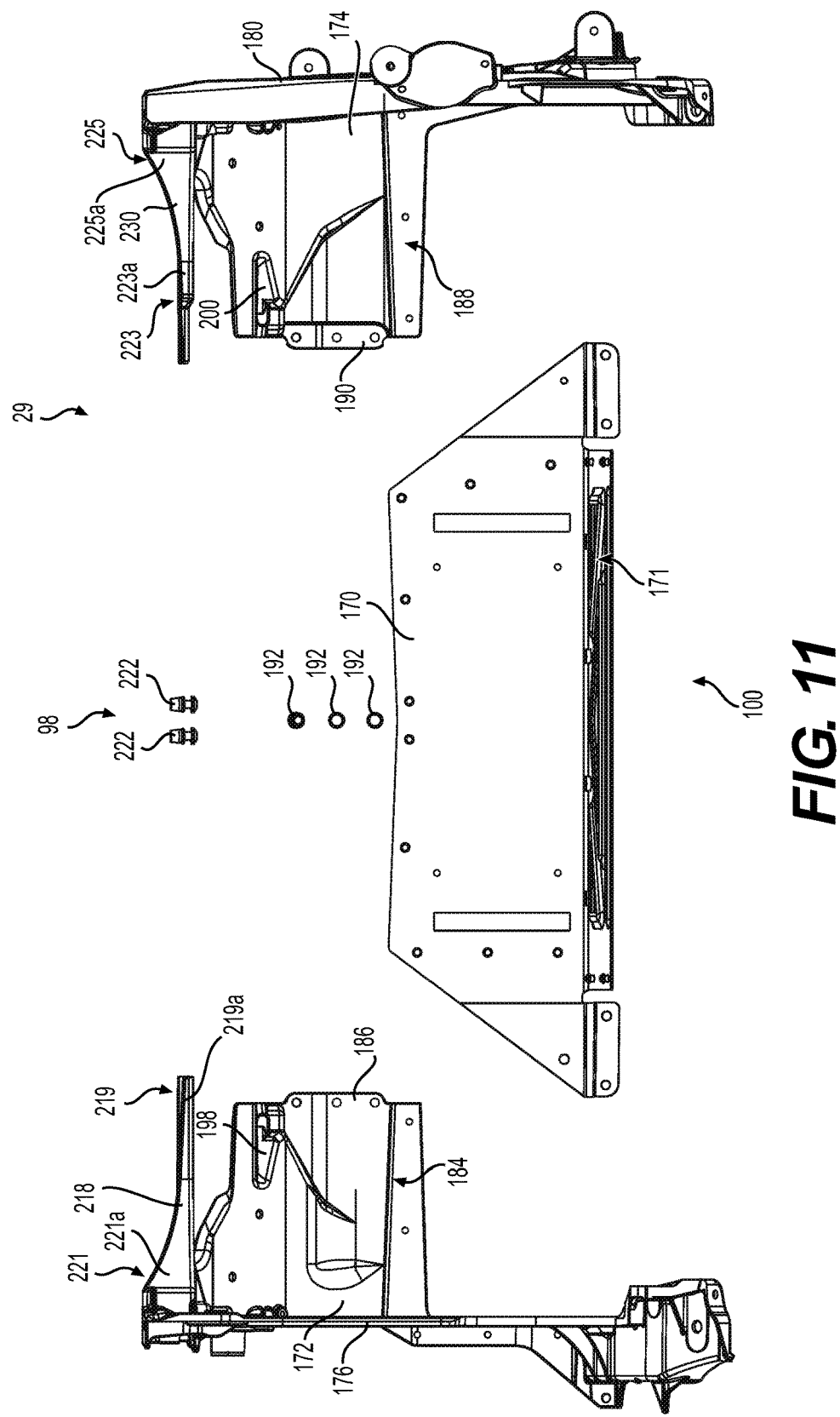
FIG. 11 is an exploded, top plan view of the motor module of FIG. 9.

As best seen in FIGS. 10 and 11, the left part 172 has a left bottom portion 184 and a left protrusion 186 extends from the left bottom portion 184 toward the right part 174. The right part 174 has a right bottom portion 188 and a right protrusion 190 extends from the right bottom portion 188 toward the left part 172. The left and right protrusions 186, 190 overlap and are connected together using three fasteners 192. In the present implementation, the fasteners 192 are huck bolts. It is contemplated that other fasteners could be used, and that more or less than three fasteners could be used. The bottom panel 170 and the left and right parts 172, 174 are further connected together using at least one of bonding and fastening techniques known in the art. When connected together, the bottom panel 170 and the left and right parts 172, 174 define a bottom wall 194 of the motor module 29. The bottom wall 194 has a convex bottom face 196 toward the front portion 98 of the motor module 29 (FIG. 13).

Figure 12B:
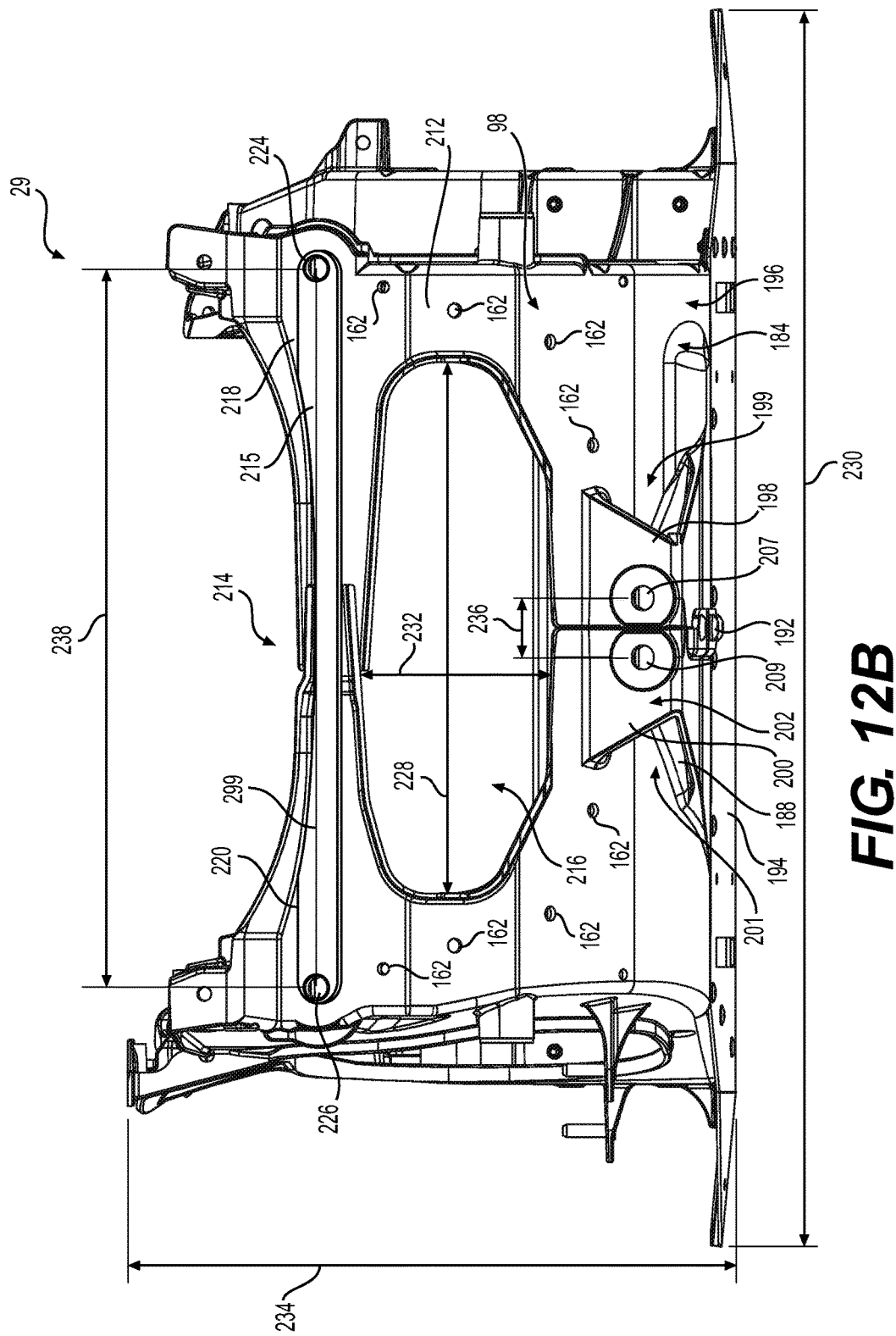
FIG. 12B is a front elevation view of the motor module of FIG. 9 according to one variant having a plate connected thereto.

Referring to FIGS. 12A, 12B and 13, forward of the bottom panel 170, the left bottom portion 184 has a left bracket 198 extending on a bottom face 199 thereof. The right bottom portion 188 has a right bracket 200 extending on a bottom face 201 thereof. When the left and right parts 172, 174 are connected together, the left bracket 198 and the right bracket 200 form a bracket 202 extending from the convex bottom face 196 of the bottom wall 194. The bracket 202 has a vertical portion 203 extending downwardly from the convex bottom face 196 and the bracket 202 also has a horizontal portion 205 extending rearwardly and perpendicularly to the vertical portion 203. The bracket 202 defines a nut cavity 210 at the rear of the vertical portion 203, above the horizontal portion 205 and below the convex bottom face 196.

The left bracket 198 has a hole 207 defined in the vertical portion 203. The left bracket 198 receives a left nut 204 (FIGS. 13 and 28) in the nut cavity 210. The right bracket 200 has a hole 209 defined in the vertical portion 203. The right bracket 200 receives a right nut 206 (FIG. 26) in the nut cavity 210. Both the left nut 204 and the right nut 206 are held in place in the nut cavity 210 by surfaces in their corresponding left and right brackets 198, 200 such that when a fastener, such as a bolt, is fastened thereto, there is no need to prevent rotation of the left and right nuts 204, 206 using a tool. As illustrated in FIG. 13, the vertical portion 203 extends perpendicularly to the fastening axes of the left and right nuts 204, 206, and the horizontal portion 205 extends rearwardly and perpendicularly to the vertical portion 203. The horizontal portion 205 thus forms a portion of the bottom wall 194 of the motor module 29.

Referring to FIGS. 9 to 12B, the front portion 98 of the motor module 29 will be described in more detail. The front portion 98 includes a front wall 212 where are defined the holes 162 corresponding to the holes 160 defined in the suspension module 32 for connection of the motor module 29 to the suspension module 32 using fasteners (not shown). The front portion 98 also defines a cross member 214 and an aperture 216 below the cross member 214. The cross member 214 is formed of a left cross member segment 218 formed integrally with an upper front portion of the left part 172. The cross member 214 is further formed of a right cross member segment 220 formed integrally with an upper front portion of the right part 174. The left and right cross member segments 218, 220 are connected together using two fasteners 222. It is contemplated that the left and right cross member segments 218, 220 could be connected together using more or less than two fasteners 222. It is also contemplated that the left and right cross member segments 218, 220 could be connected using any other suitable technique known in the art, such as welding. The left and right cross member segments 218, 220 have a C-shaped cross section (FIG. 10). Other suitable cross section profiles, such as an I-shaped cross section, are contemplated.

Referring to FIG. 12B illustrating one variant of the motor module 29, the left and right cross member segments 218, 220 are welded together and form the cross member 214. A plate 215 is disposed longitudinally forward of the front portion 98 of the motor module 29 and connected to the cross member 214. The plate 215 is shaped and configured to be received inside the C-shaped cross-section of the left and right cross member segments 218, 220. The plate 215 is connected to the left and right cross member segments 218, 220 using fasteners, such as rivets. Any other suitable technique known in the art could be used to connect the plate 215 to the left and right cross member segments 218, 220, such as bonding or welding.

Referring to FIGS. 11 to 12B, the left cross member segment 218 has a left proximal portion 219 and a left distal portion 221. The left proximal portion 219 has a left proximal top portion 219a and the left distal portion 221 has a left distal top portion 221a. The left distal top portion 221a is longitudinally longer than the left proximal top portion 219a. Similarly, the right cross member segment 220 has a right proximal portion 223 and a right distal portion 225. The right proximal portion 223 has a right proximal top portion 223a and the right distal portion 225 has a right distal top portion 225a. The right distal top portion 225a is longitudinally longer than the right proximal top portion 223a.

Toward the left and right distal portions 221, 225 of the cross member 214, left and right upper holes 224, 226 are defined in the front wall 212 of the motor module 29. Referring to FIG. 12B, the plate 215 also has holes aligned with left and right upper holes 224, 226.

Figure 12D:
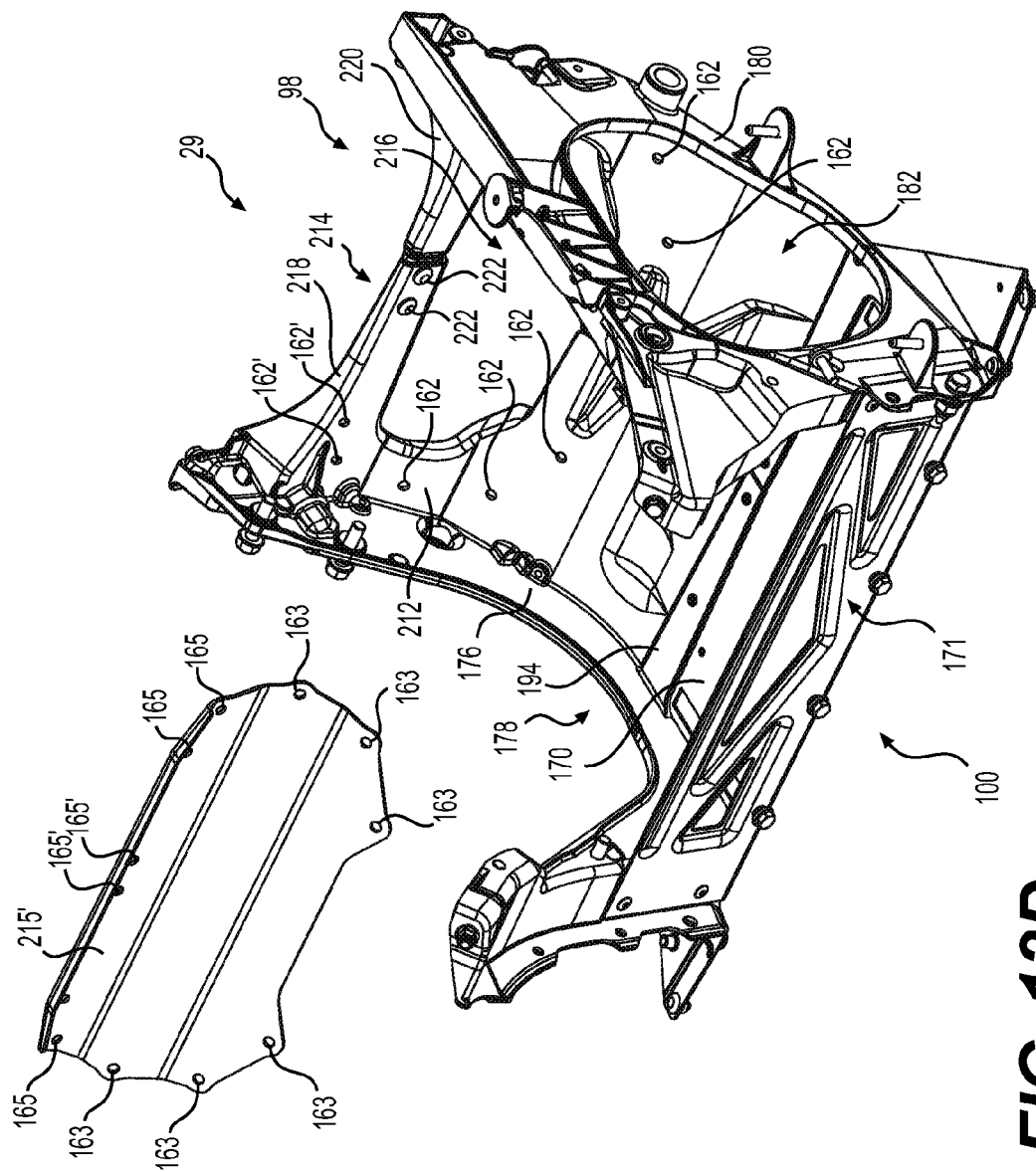
FIG. 12D is a top, rear, right side perspective view of the motor module of FIG. 12C, with the plate disconnected from the motor module.
Figure 14:
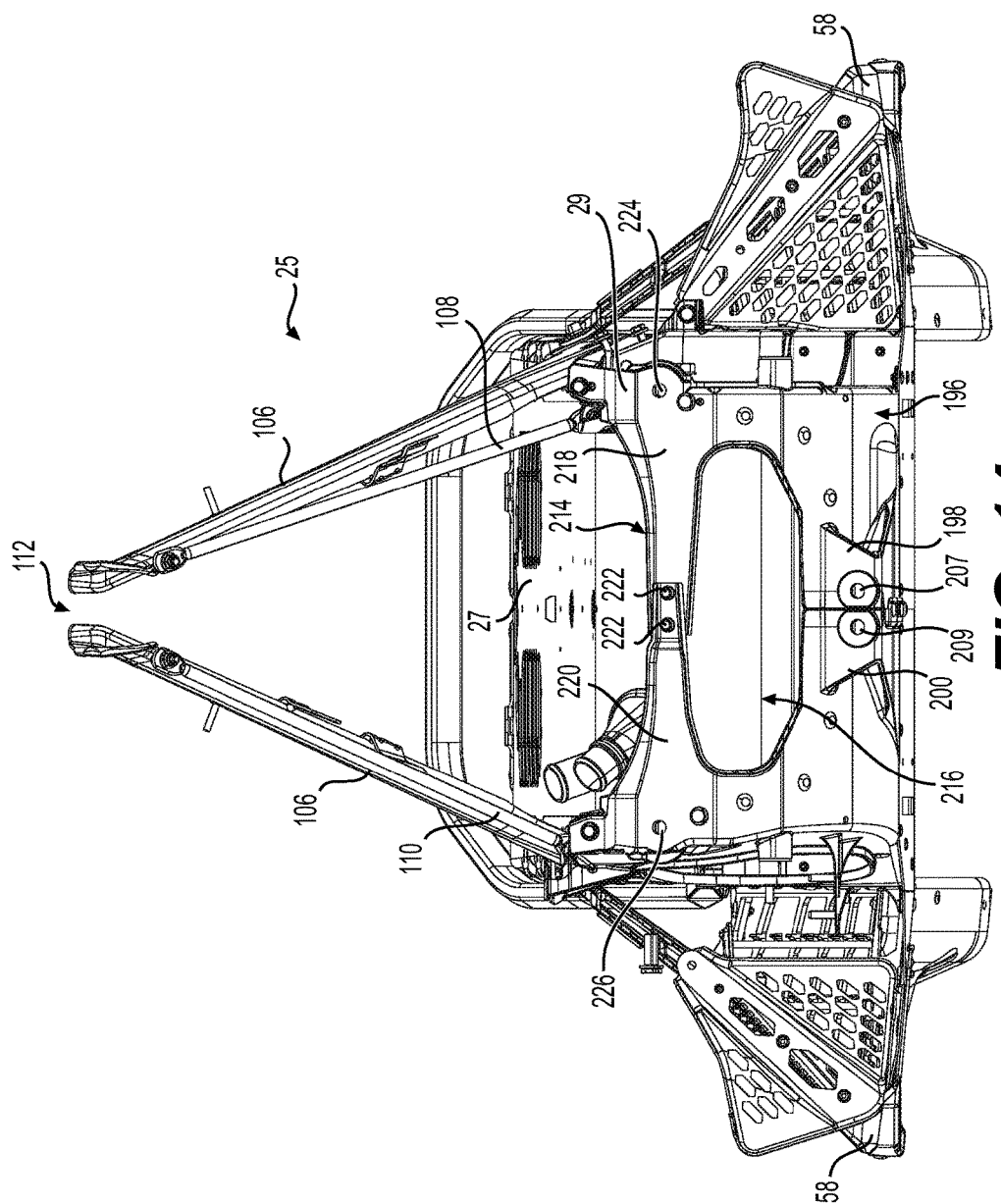
FIG. 14 is a front elevation view of the frame of FIG. 2, with the suspension module omitted.
Figure 15:
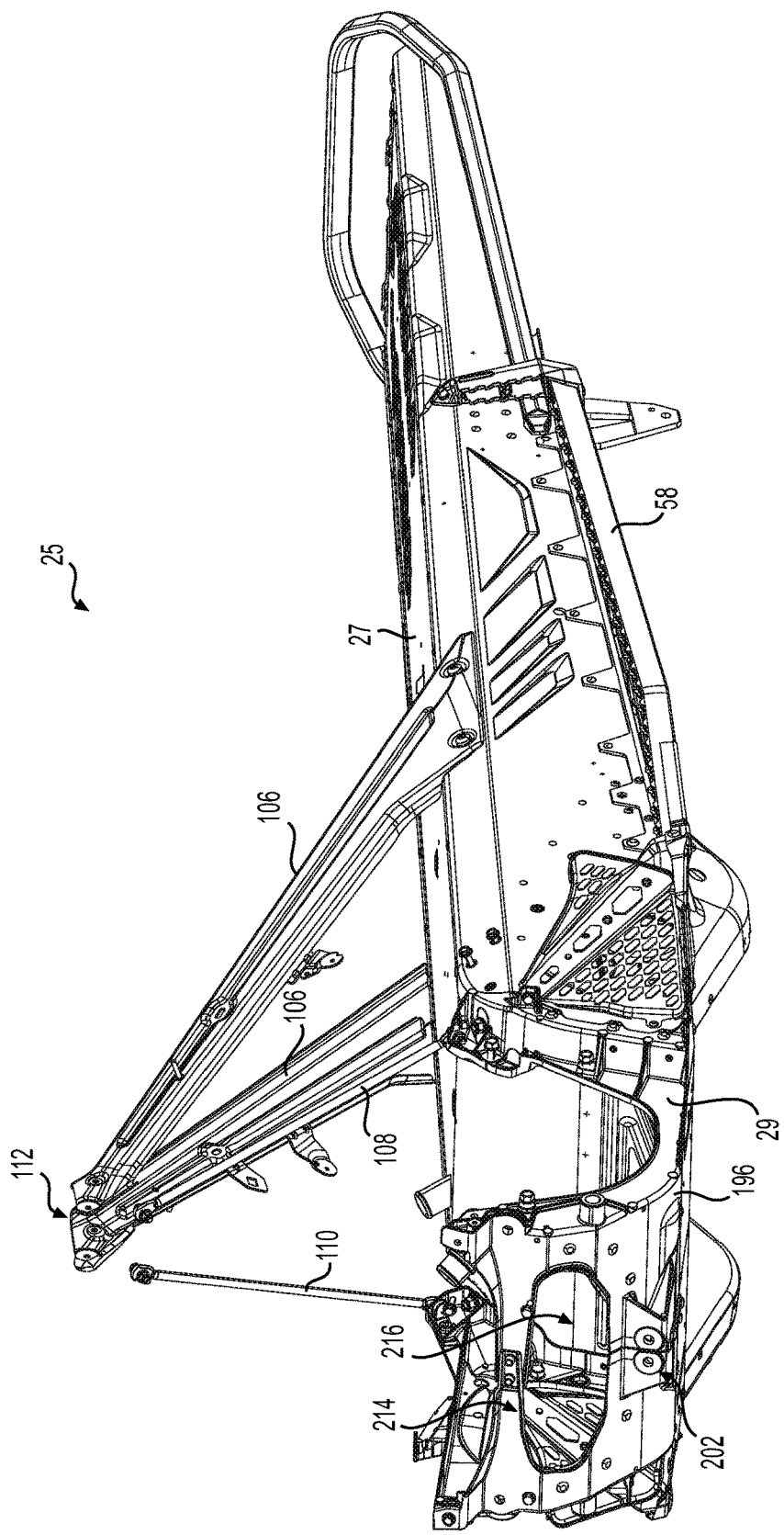
FIG. 15 is a front, left side perspective view of the frame portions of FIG. 14.
Figure 16:
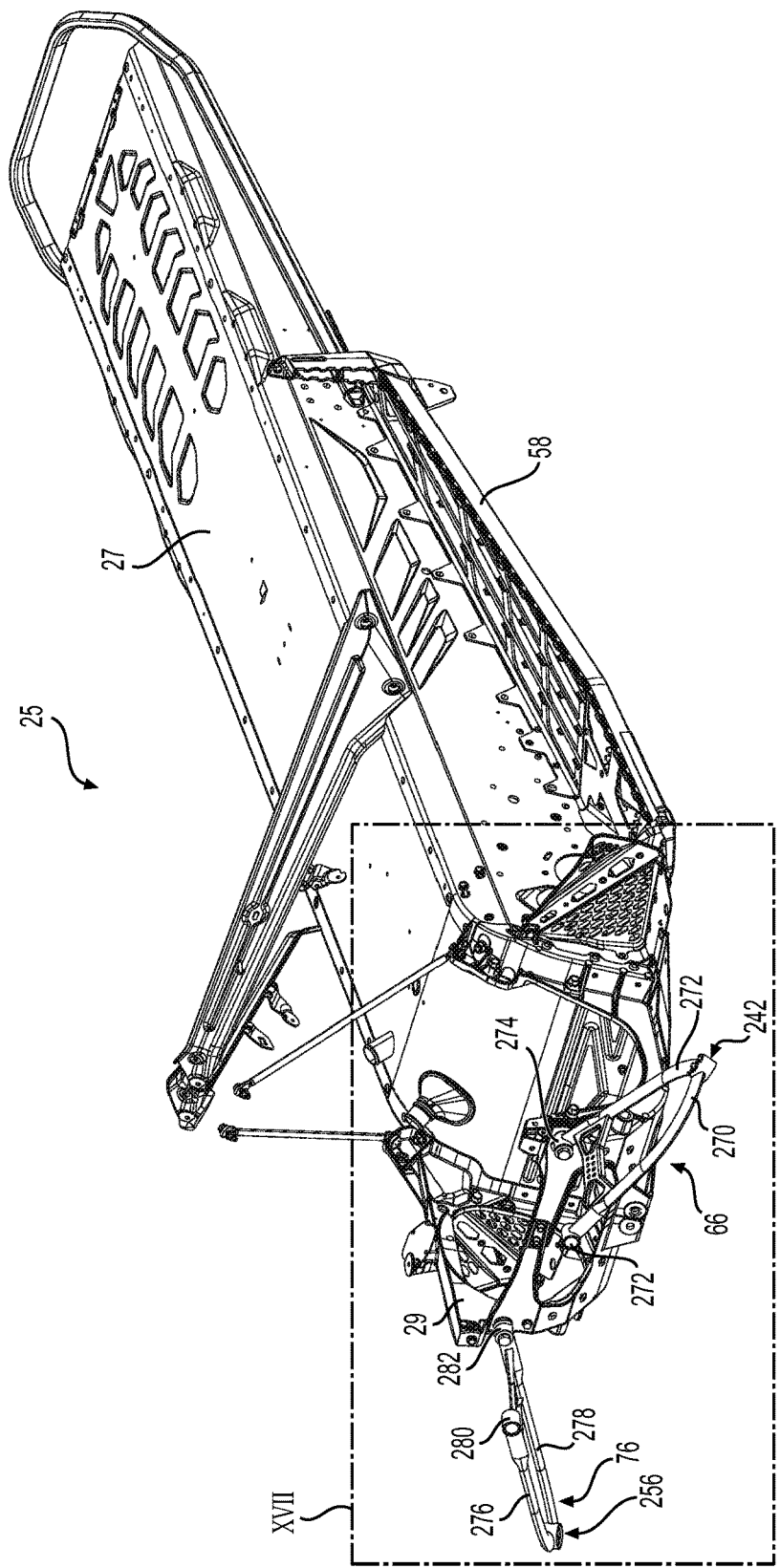
FIG. 16 is a top, front, left side perspective view of the frame of FIG. 14, with upper left and right suspension arms connected to the motor module.

Referring to FIGS. 12C and 12D illustrating another variant of the motor module 29, a plate 215' is positioned longitudinally rearward of the cross member 214. The plate 215' covers the aperture 216 below the cross member 214. In some implementations, the plate 215' is made of sheet metal and is configured to conform to the profile of the front portion 98 of the motor module 29. A plurality of holes 163 are defined on the plate 215'. Each one of the holes 163 is aligned with a corresponding hole 162 defined in the motor module 29 and a corresponding hole 160 defined in the suspension module 32. The plate 215', the motor module 29 and the suspension module 32 are connected together, at least partially, using fasteners 163'. The upper portion of the plate 215' includes holes 165 defined therein. The holes 165 are aligned with corresponding holes 162' defined in the motor module 29, such that fasteners (not shown) may be used to further connect the plate 215' to the motor module 29. The upper portion of the plate 215' also includes two holes 165' defined therein. The two holes 165' allow passage of the two fasteners 222 used to connect together the left and right cross member segments 218, 220. As such, the plate 215' is further connected to the motor module 29 by the two fasteners 222. It is contemplated that the plate 215' could be further connected to the motor module 29 using any other suitable technique known in the art, such as bonding or welding.

Referring back to FIG. 12A, the aperture 216 defined in the front portion 98 of the motor module 29 has a width 228. The width 228 is taken horizontally and perpendicularly to the longitudinal centerline 37 of the frame 25 of the snowmobile 20. The motor module 29 has an overall width 230. The overall width 230 of the motor module 29 is taken horizontally and perpendicularly to the longitudinal centerline 37 of the frame 25 of the snowmobile 20. A ratio of the width 228 of the aperture 216 over the overall width 230 of the motor module 29 is 0.3 or more. In some implementations, the ratio is 0.4 or more.

In addition, the aperture 216 has a height 232. The height 232 is taken vertically and perpendicularly to the longitudinal centerline 37 of the frame 25 of the snowmobile 20. The motor module 29 has an overall height 234. The overall height 234 of the motor module 29 is taken vertically and perpendicularly to the longitudinal centerline 37 of the frame 25 of the snowmobile 20. A ratio of the height 232 of the aperture 216 over the overall height 234 of the motor module 29 is 0.25 or more. In some implementations, the ratio is 0.28 or more.

Still referring to FIG. 12A, holes 207, 209 are separated by a center-to-center distance 236. The upper holes 224, 226 are separated by a distance 238. A ratio of the distance 236 over the distance 238 is 0.1 or less. In some implementations, the ratio is 0.08 or less. A ratio of the width 228 of the aperture 216 over the distance 238 is 1.25 or more. In some implementations, the ratio is 1.30 or more.

With reference to FIGS. 14 to 30, the left and right front suspension assemblies 34, 35 and their connection to the motor module 29 and to the suspension module 32 will be described in more detail.

Figure 22:
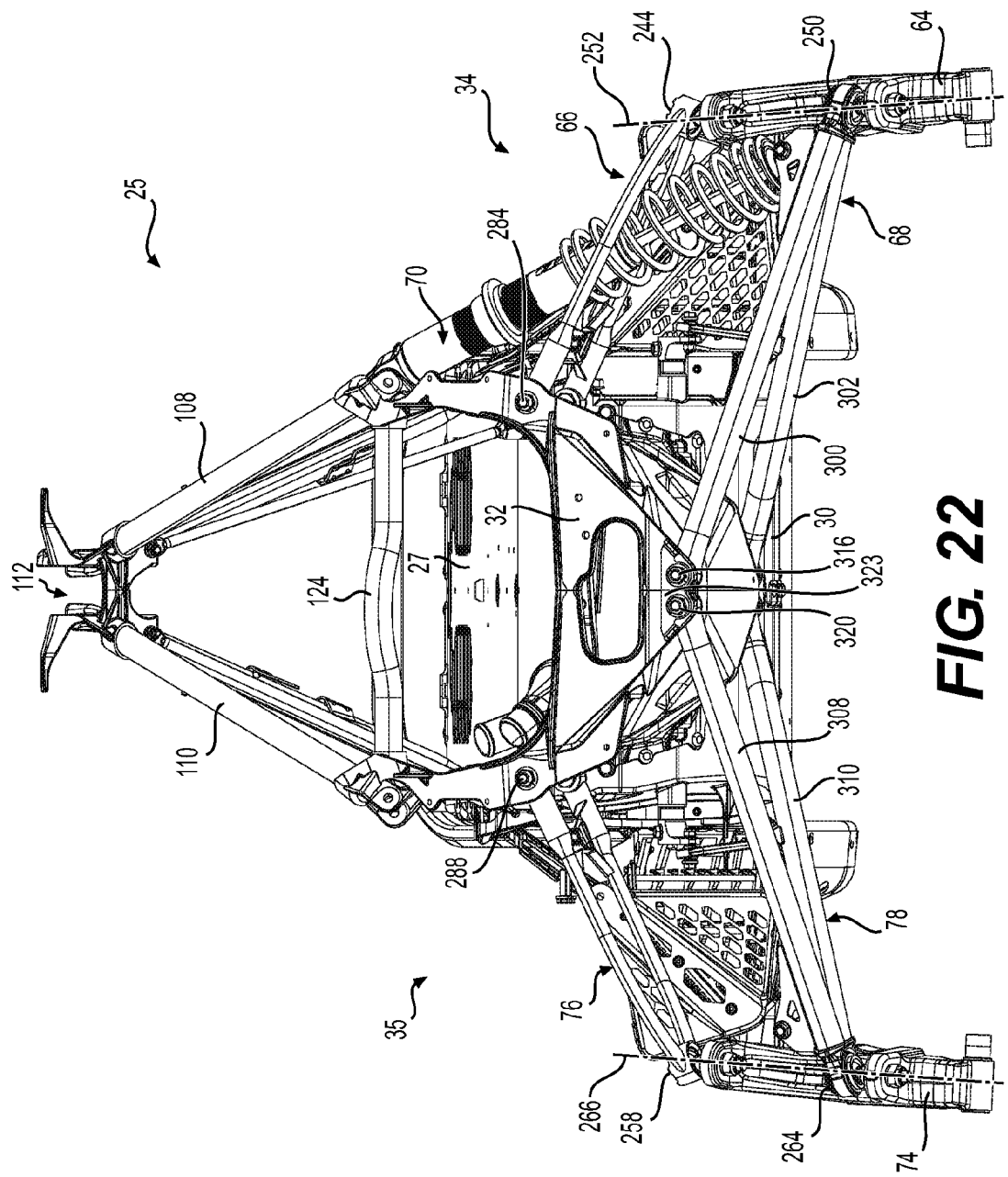
FIG. 22 is a front elevation view of the frame of FIG. 18, with the right shock absorber assembly omitted.
Figure 23:
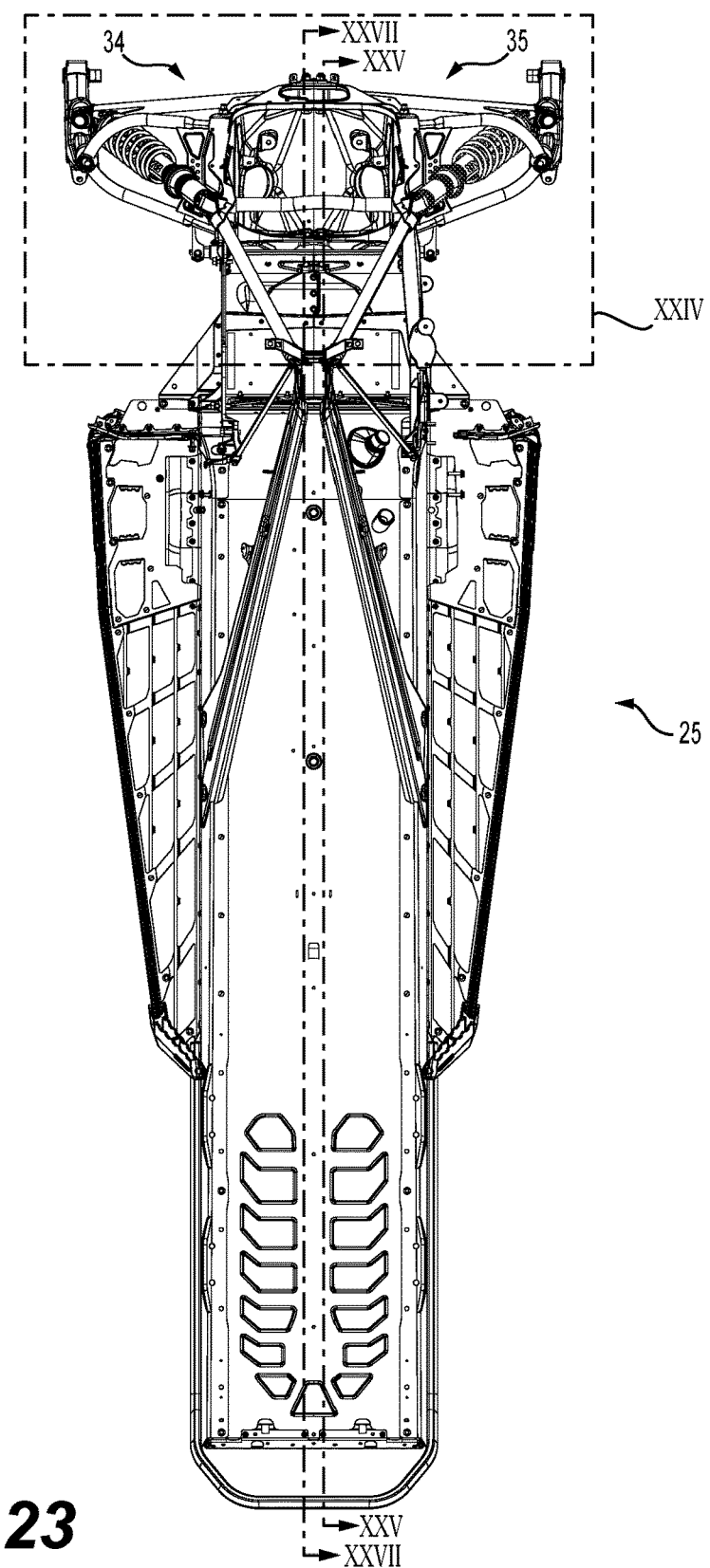
FIG. 23 is a top plan view of the frame and front suspension assemblies of FIG. 18.

The left and right front suspension assemblies 34, 35 are connected to the left and right ski legs 64, 74. An upper front tab 240 of the left ski leg 64 is connected to the upper left suspension arm 66 at a distal end 242 thereof through a ball joint 244 (FIG. 24). A lower front tab 246 of the left ski leg 64 is connected to the lower left suspension arm 68 at a distal end 248 thereof through a ball joint 250. The left ski leg 64 may pivot and rotate with respect to a left ski leg pivot axis 252 passing through the ball joints 244, 250 (FIG. 22). Similarly, an upper front tab 254 of the right ski leg 74 is connected to the upper right suspension arm 76 at a distal end 256 thereof through a ball joint 258 (FIG. 24). A lower front tab 260 of the right ski leg 74 is connected to the lower right suspension arm 78 at a distal end 262 thereof through a ball joint 264. The right ski leg 74 may pivot and rotate with respect to a right ski leg pivot axis 266 passing through the ball joints 258, 264 (FIG. 22).

The upper left suspension arm 66 has upper left front and rear members 270, 272 meeting at the distal end 242. The upper left front member 270 includes an upper left front proximal end 272 (FIG. 19), and the upper left rear member 272 includes an upper left rear proximal end 274 (FIG. 17). Similarly, the upper right suspension member 76 has upper right front and rear members 276, 278 meeting at the distal end 256. The upper right front member 276 includes an upper right front proximal end 280 (FIG. 17), and the upper right rear member 278 includes an upper right rear proximal end 282.

Figure 8:
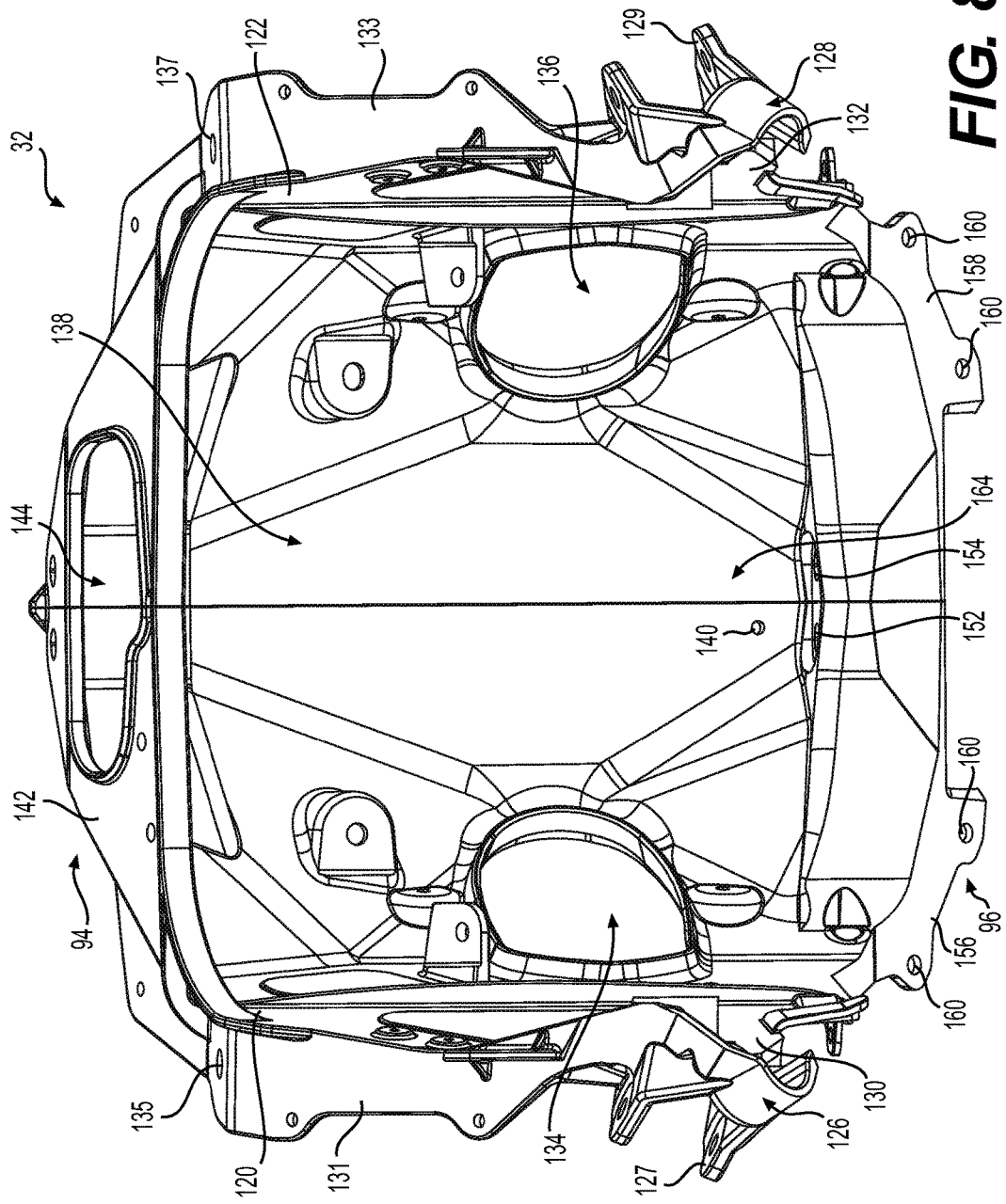
FIG. 8 is a top plan view of the suspension module of FIG. 5.
Figure 9:
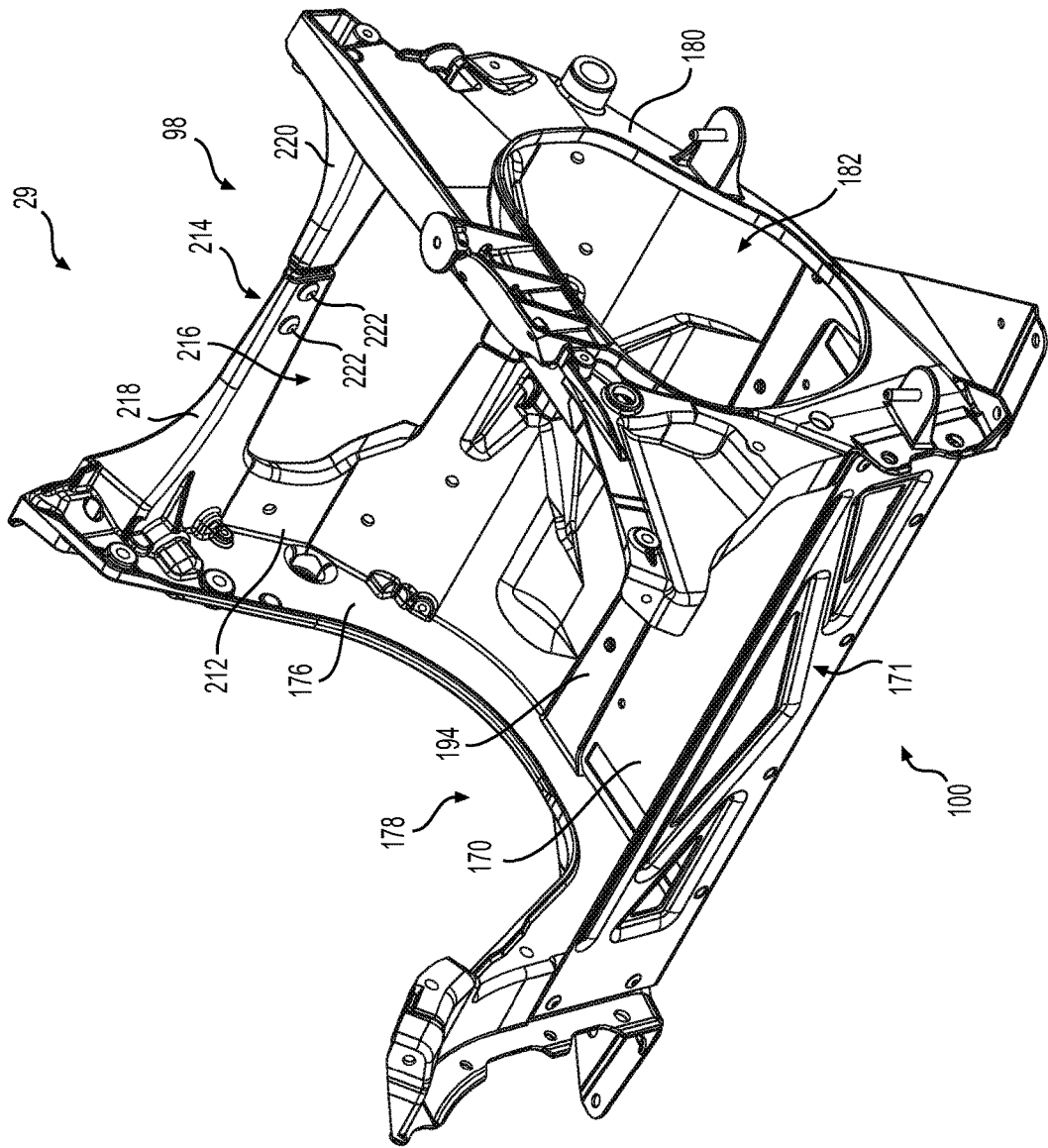
FIG. 9 is a top, rear, right side perspective view of a motor module.

The upper left front proximal end 272 is connected to the suspension module 32 by an upper left front proximal fastener 284 passing through the upper left front proximal end 272 and extending through the left tab 135 of the suspension module 32 (FIG. 8). The upper left front proximal fastener 284 pivotally connects the upper left front member 270 to the suspension module 32 about an upper front left pivot axis 286 (FIG. 24). Similarly, the upper right front proximal end 280 is connected to the suspension module 32 by an upper right front proximal fastener 288 passing through the upper right front proximal end 280 and extending through the right tab 137 of the suspension module 32 (FIG. 8). The upper right front proximal fastener 288 pivotally connects the upper right front member 276 to the suspension module 32 about an upper front right pivot axis 290.

Figure 17A:
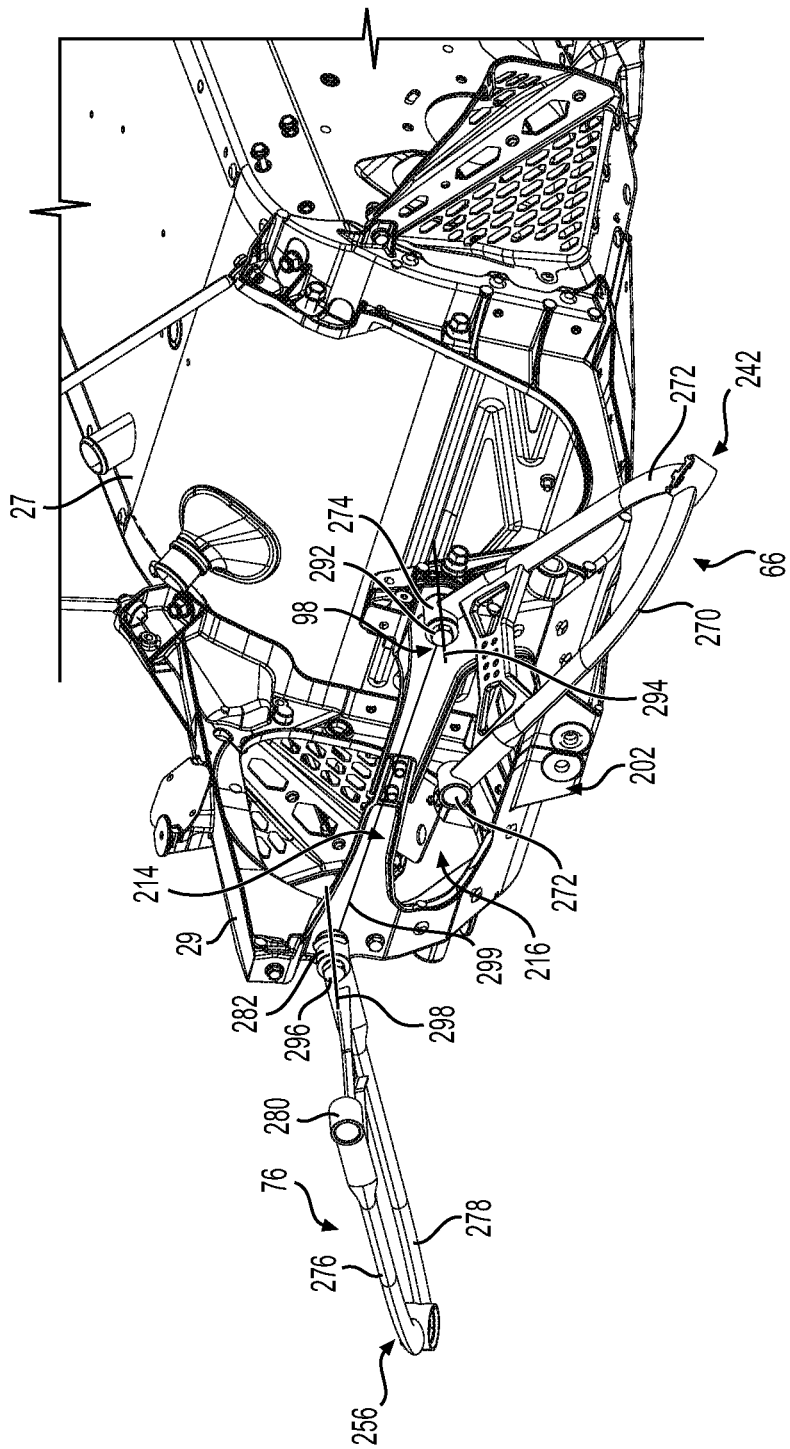
FIG. 17A is an enlarged view of the portion XVII of the frame of FIG. 16.
Figure 19:
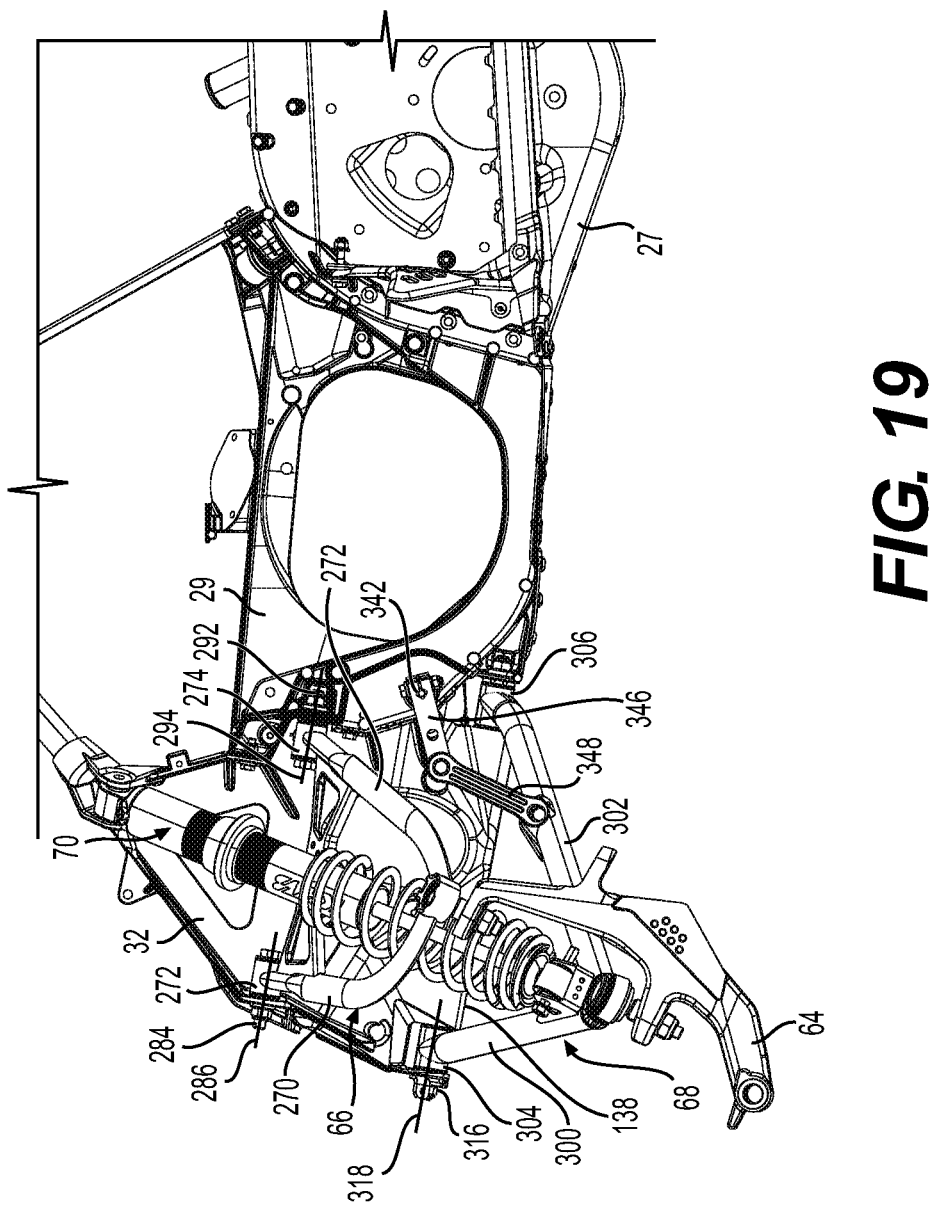
FIG. 19 is an enlarged view of the portion XIX of the frame and suspension assemblies of FIG. 18.
Figure 20:
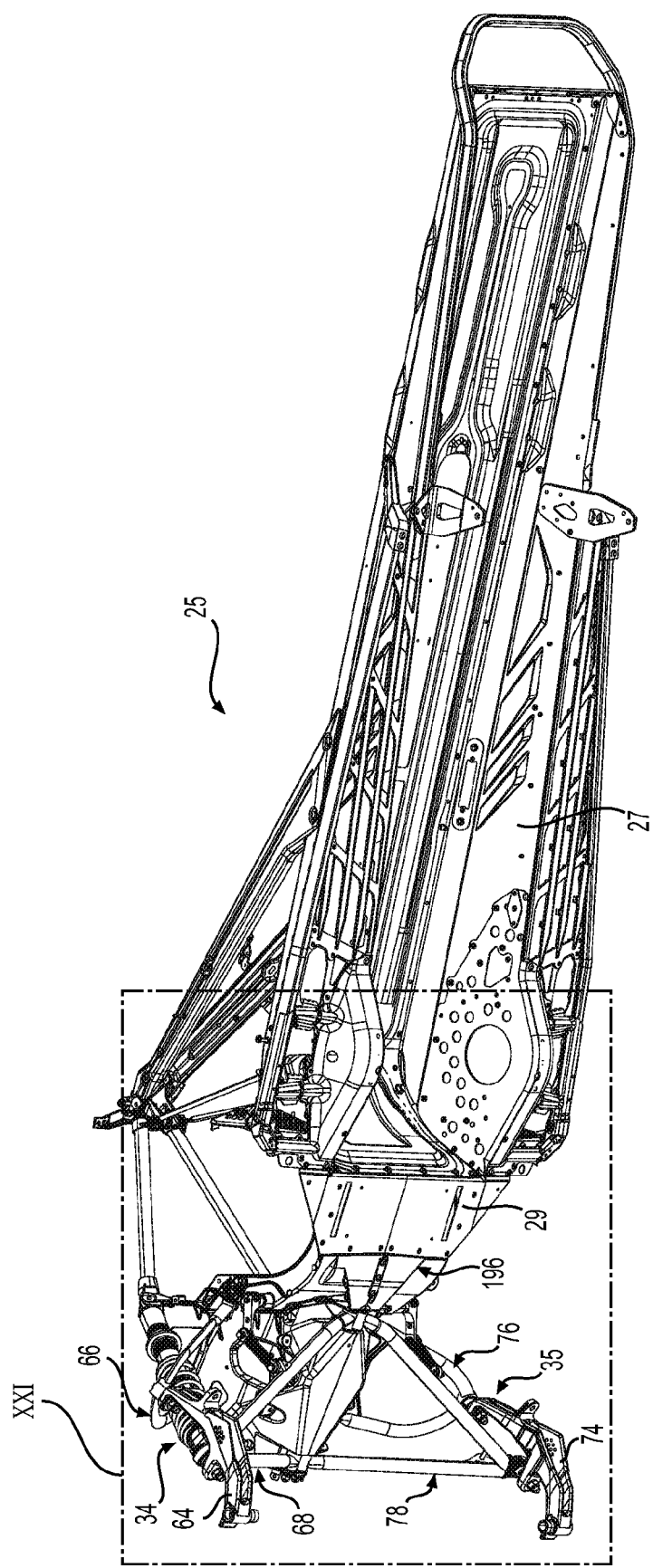
FIG. 20 is a bottom, rear, left side perspective view of the frame of FIG. 18, with a right shock absorber assembly omitted.

The upper left rear proximal end 274 is positioned longitudinally forward of the front portion 98 of the motor module 29 (FIG. 17). The upper left rear proximal end 274 is connected to the motor module 29 by an upper left rear proximal fastener 292 passing through the upper left rear proximal end 274 and extending through the upper left hole 224 of the motor module 29 (FIG. 12A). The upper left rear proximal fastener 292 pivotally connects the upper left rear member 272 to the motor module 29 about an upper rear left pivot axis 294 (FIGS. 17 and 19). Similarly, the upper right rear proximal end 282 is positioned longitudinally forward of the front portion 98 of the motor module 29 (FIG. 17). The upper right rear proximal end 282 is connected to the motor module 29 by an upper right rear proximal fastener 296 (FIG. 17) passing through the upper right rear proximal end 282 and extending through the upper right hole 226 of the motor module 29 (FIG. 12A). The upper right rear proximal fastener 296 pivotally connects the upper right rear member 278 to the motor module 29 about an upper rear right pivot axis 298 (FIG. 19). Referring to FIGS. 12A and 17A, it can be seen that a line 299 extending from the upper rear left pivot axis 294 to the upper rear right pivot axis 298 is completely contained in the cross member 214.

Figure 17B:
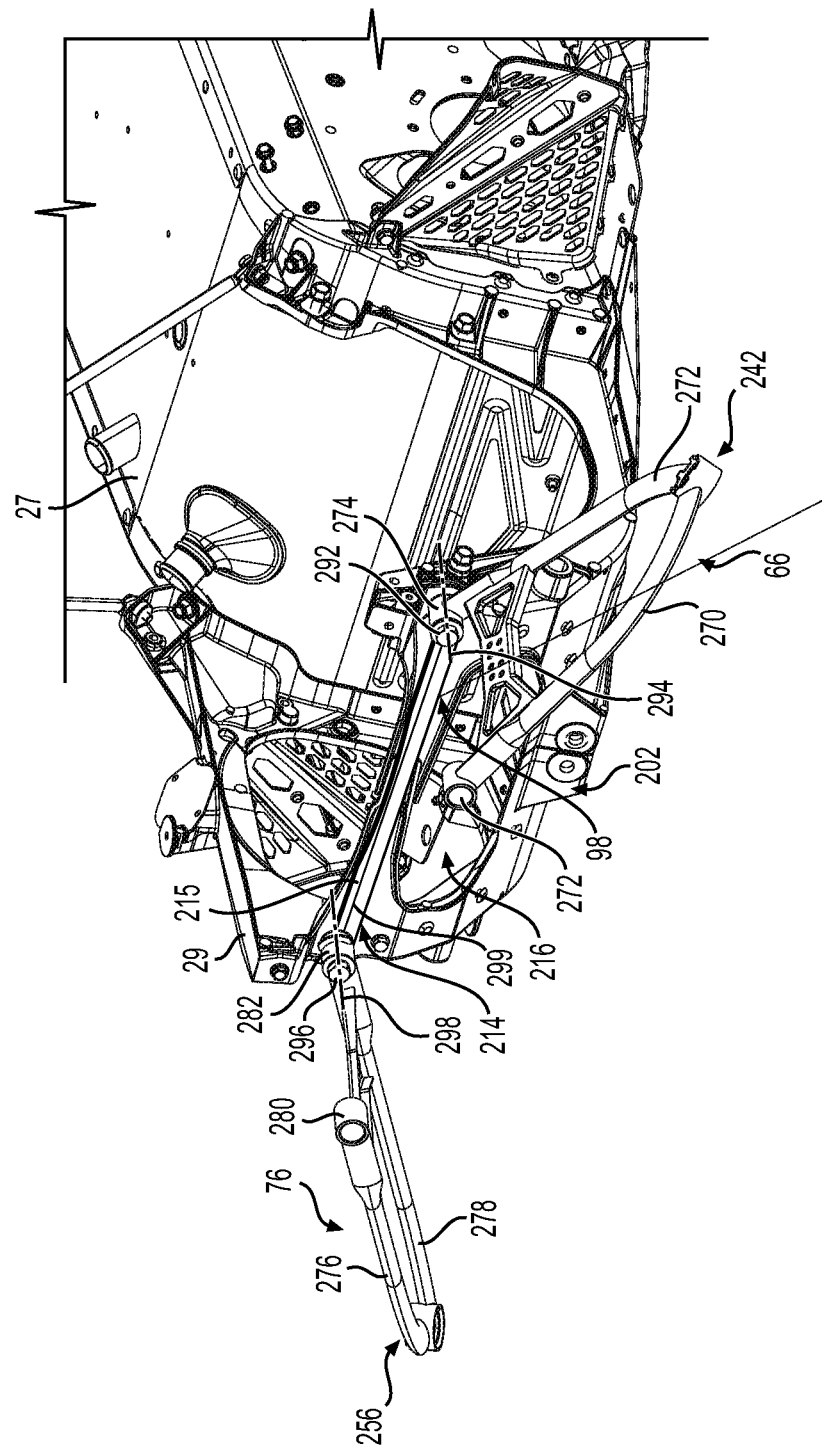
FIG. 17B is an enlarged view of the portion XVII of the frame of FIG. 16 having the motor module presented in FIG. 12B.
Figure 18:
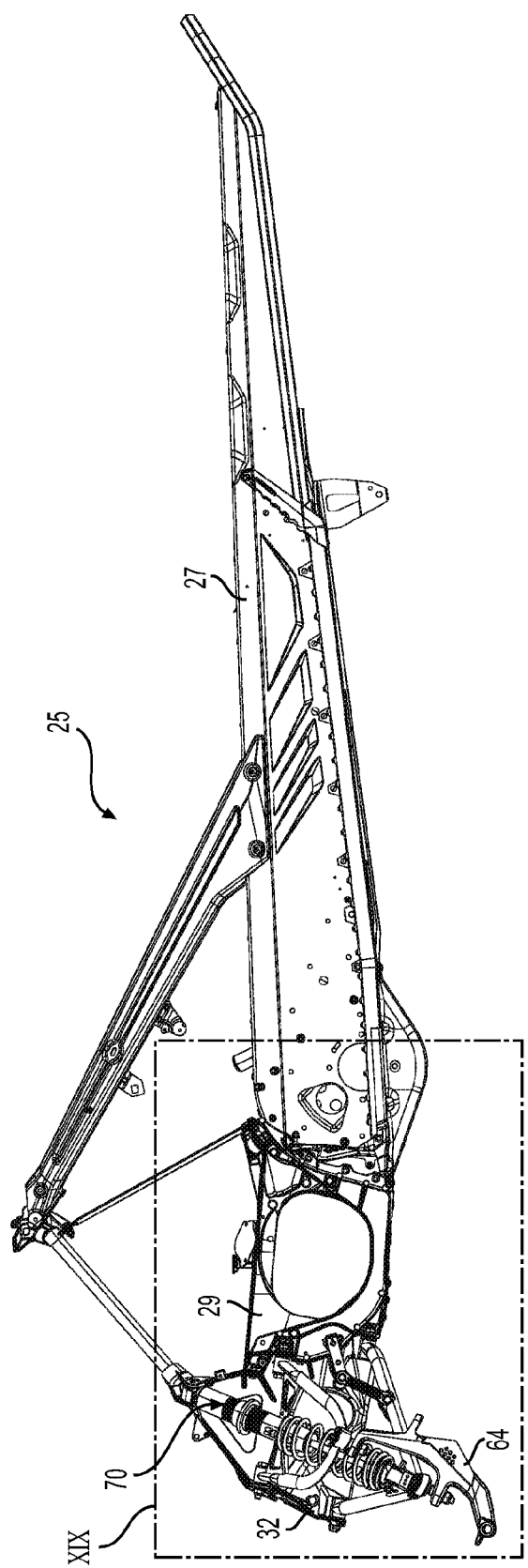
FIG. 18 is a left side elevation view of the frame of FIG. 2, with the suspension module connected to the frame and front suspension assemblies connected to the frame.

Referring to the variant of the motor module 29 shown in FIGS. 12B and 17B, the plate 215 is disposed rearward of the upper left rear proximal end 274 and the upper right rear proximal end 282. The plate 215 is further connected to the cross member 214 of the motor module 29 upon connection of the upper left rear proximal end 274 using the upper left rear proximal fastener 292 and the upper right rear proximal end 282 using the upper right rear proximal fastener 296. Such connection of the plate 215 is complementary to its fastened connection to the motor module 29 described above. In some embodiments, the plate 215 is further connected to the motor module 29 using the upper left rear proximal fastener 292 and the upper right rear proximal fastener 296. The plate 215 extends laterally between the upper rear left pivot axis 294 and the upper rear right pivot axis 298. In the variant shown in FIG. 17B where the plate 215 is connected to the cross member 214, modifications to at least one of the motor module 29, the upper left rear proximal end 274, the upper right rear proximal end 282, the upper left rear proximal fastener 292 and the upper right rear proximal fastener 296 are contemplated to take into account the thickness of the plate 215 so that the configuration of the left and right front suspension arms 66, 76 presented in FIG. 17B remain similar to the left and right front suspension arms 66, 76 presented in FIG. 17A. Referring to FIGS. 12B and 17B, the line 299 extending between the upper left hole 224 and the upper right hole 226 is completely contained in the cross member 214 and in the plate 215.

Figure 30:
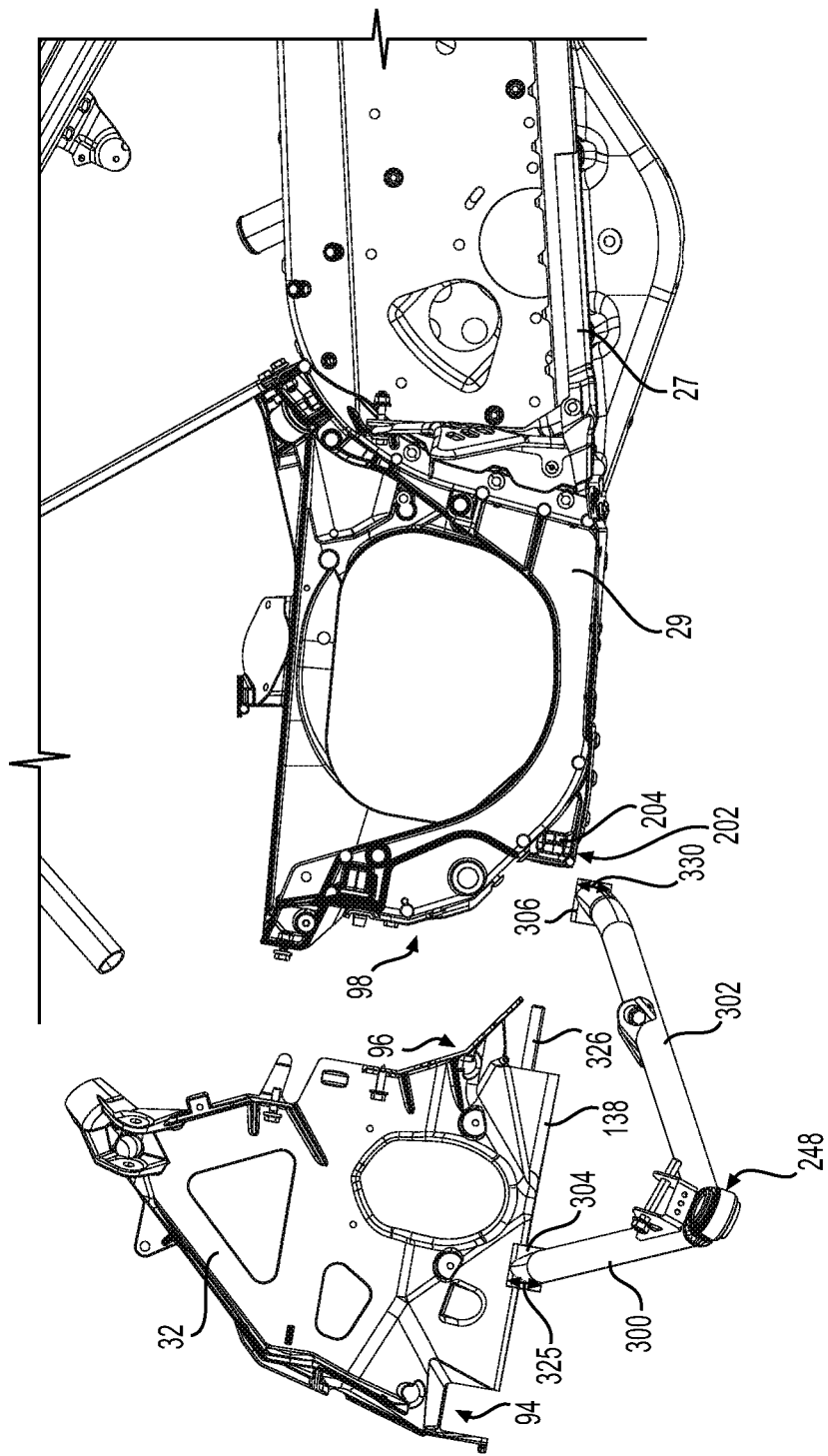
FIG. 30 is an enlarged view of portion XXX of the frame and the lower left suspension arm of FIG. 29.

The lower left suspension arm 68 has lower left front and rear members 300, 302 meeting at the distal end 248 (FIGS. 24 and 30). The lower left front member 300 includes a lower left front proximal end 304, and the lower left rear member 302 includes a lower left rear proximal end 306. Similarly, the lower right suspension member 78 has lower right front and rear members 308, 310 meeting at the distal end 262 (FIG. 24). The lower right front member 308 includes a lower right front proximal end 312 (FIG. 21), and the lower right rear member 310 includes a lower right rear proximal end 314.

Figure 6:
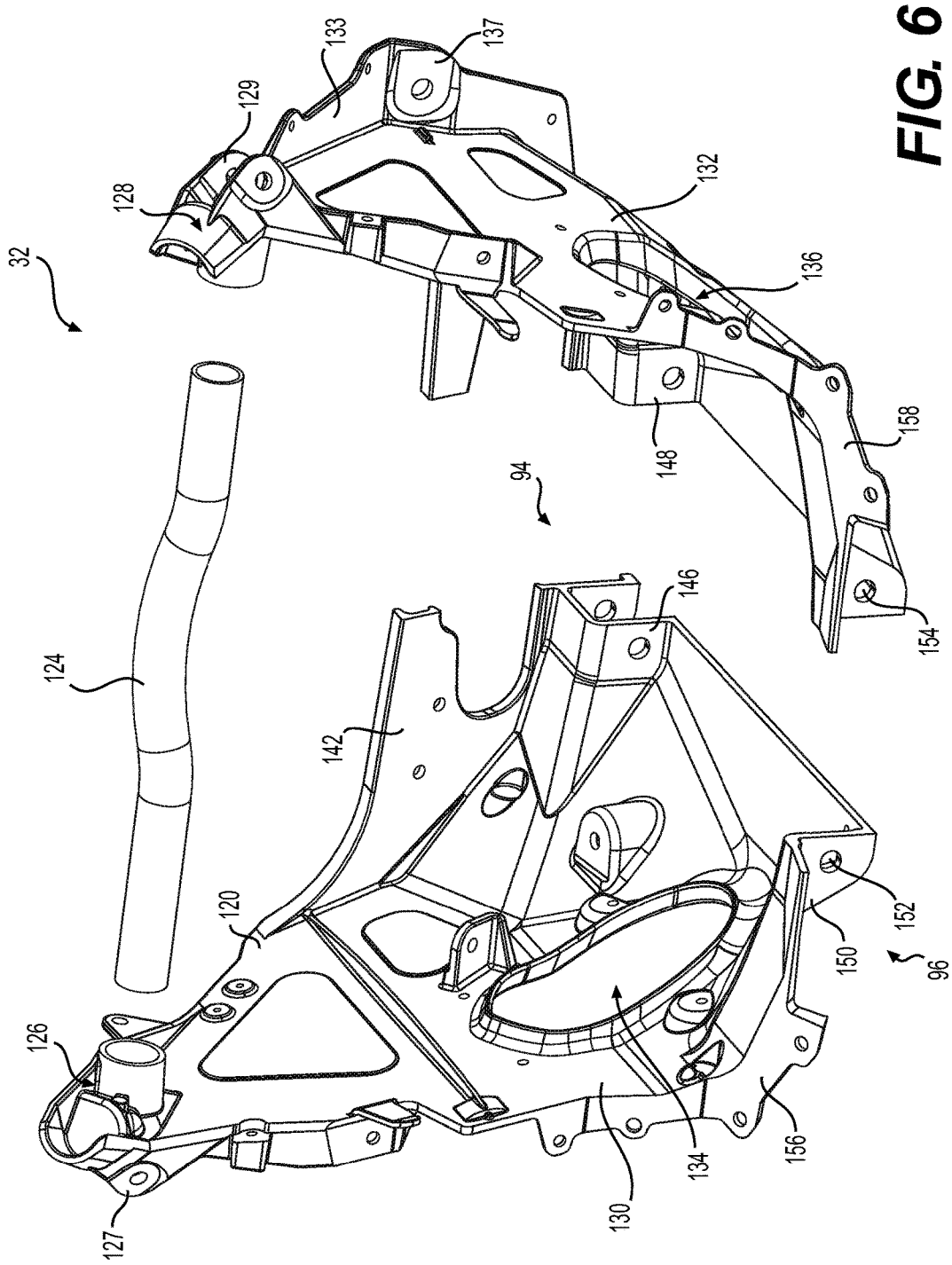
FIG. 6 is an exploded, top, rear, right side perspective view of the suspension module of FIG. 5, with a cross bar.
Figure 7:
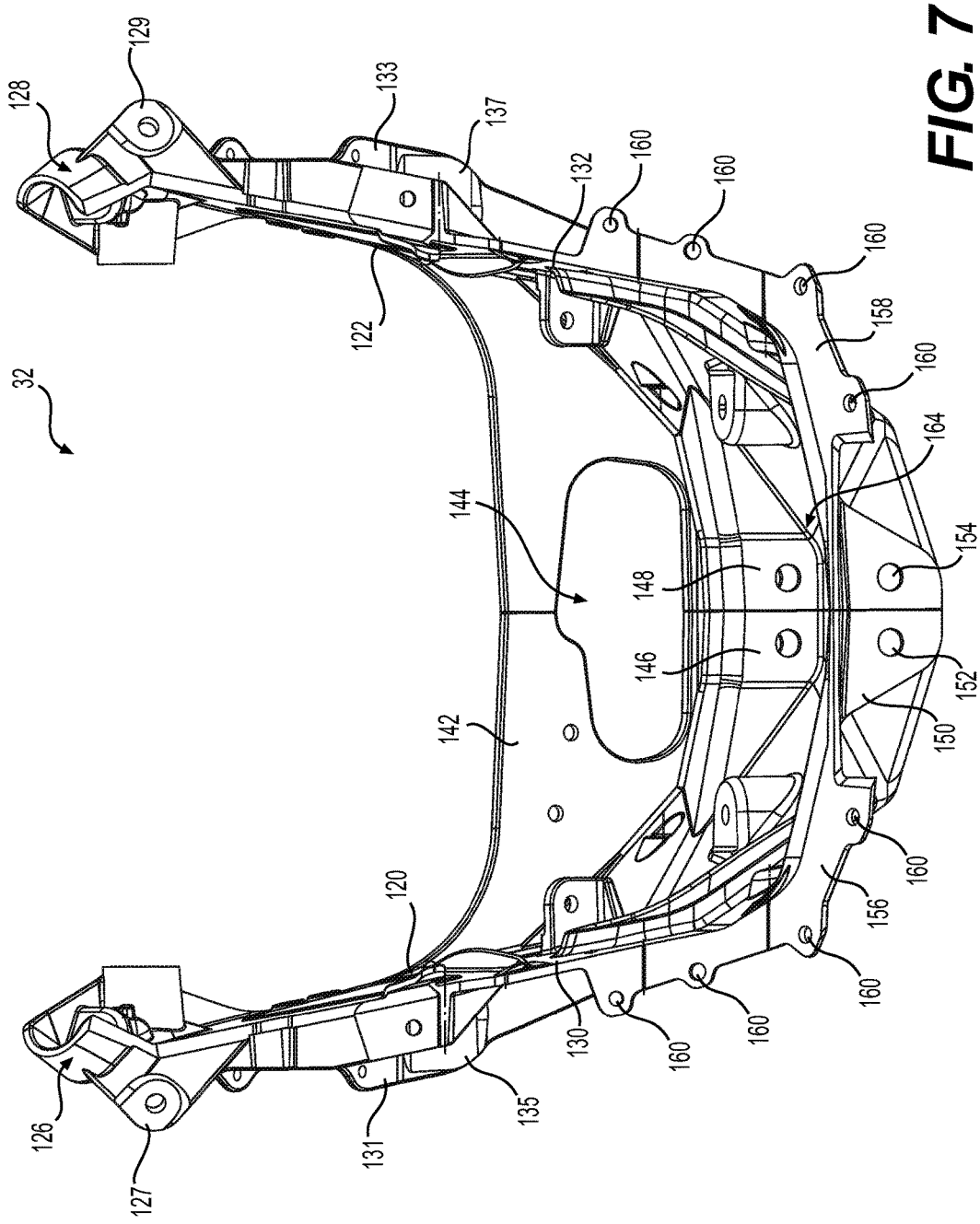
FIG. 7 is a rear elevation view of the suspension module of FIG. 5.
Figure 26:
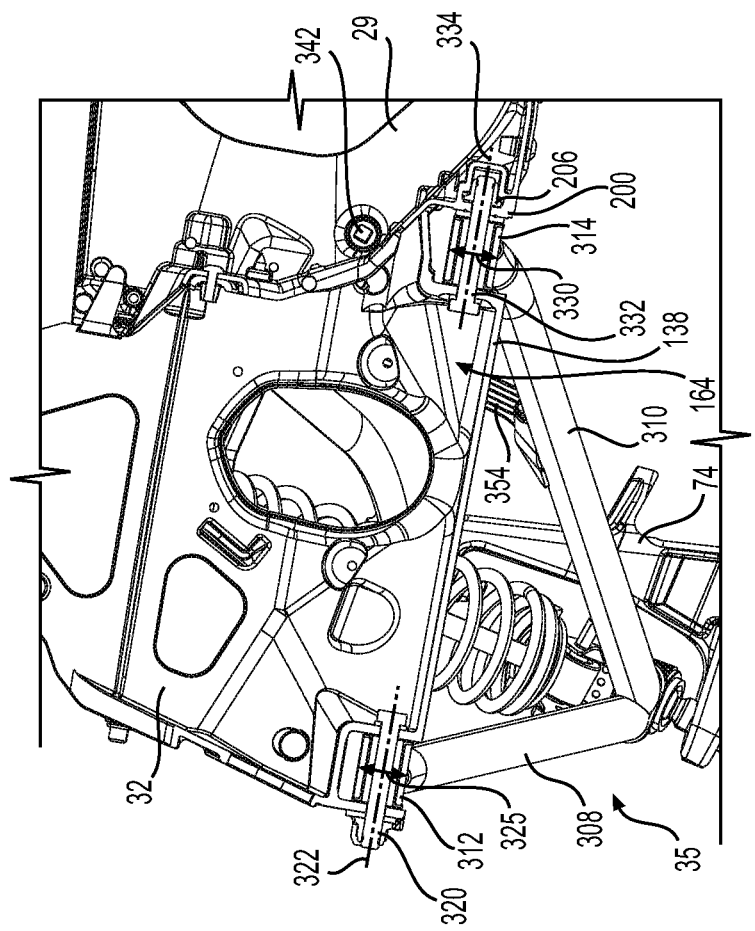
FIG. 26 is an enlarged view of the portion XXVI of the frame and front suspension assemblies of FIG. 25.
Figure 27:
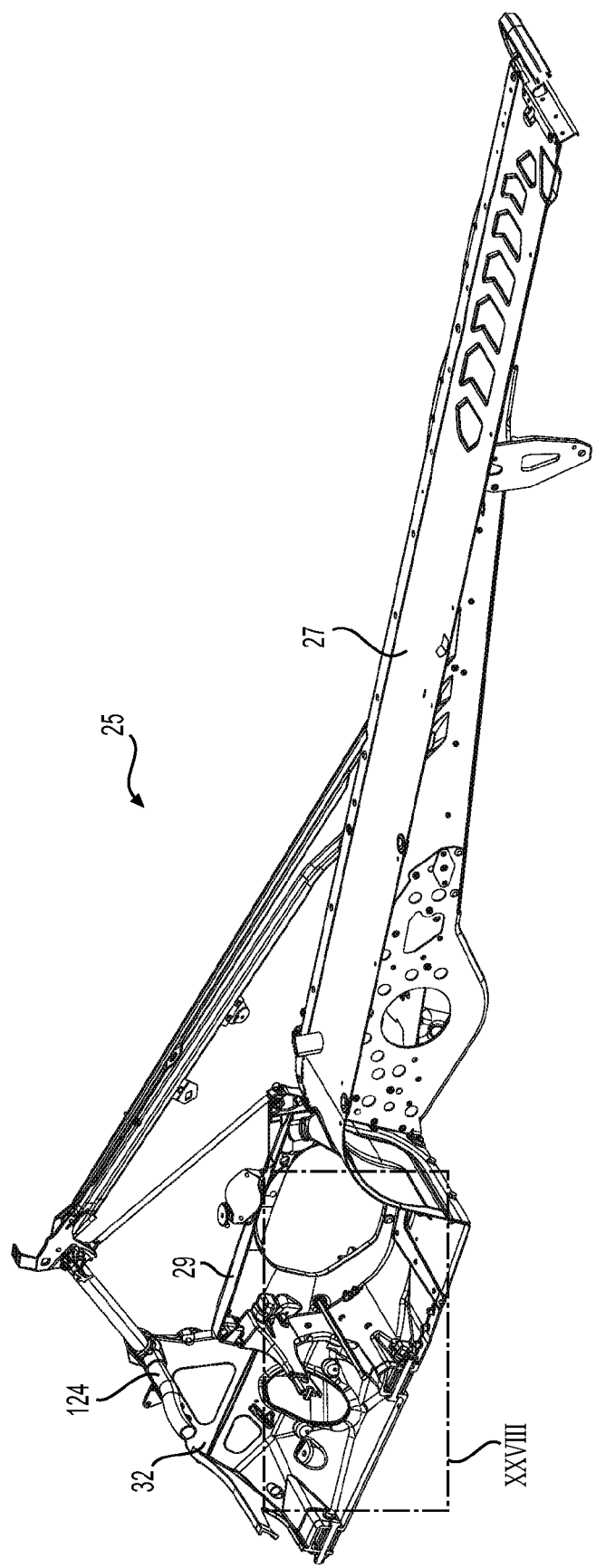
FIG. 27 is top, rear, left side cross-sectional perspective view of the frame and front suspension assemblies of FIG. 18 taken along line XXVII-XXVII of FIG. 23.

The lower left front proximal end 304 is positioned below the front portion 94 of the suspension module 32 and longitudinally forward of the bottom wall 138 of the suspension module 32. The lower left front proximal end 304 is connected to the suspension module 32 by a lower left front proximal fastener 316 passing through the lower left front proximal end 306 and extending through the lower front left tabs 146 of the suspension module 32 (FIGS. 6, 22 and 24). The lower left front proximal fastener 316 extends in the interior portion 164, above the bottom wall 138 of the suspension module 32 (FIGS. 19 and 24). The lower left front proximal fastener 316 pivotally connects the lower left front member 300 to the suspension module 32 about a lower front left pivot axis 318 (FIGS. 19 and 24). The lower front left pivot axis 318 extends through the interior portion 164, above the bottom wall 138 of the suspension module 32 (FIG. 19). Similarly, the lower right front proximal end 312 is positioned below the front portion 94 of the suspension module 32 and longitudinally forward of the bottom wall 138 of the suspension module 32. The lower right front proximal end 312 is connected to the suspension module 32 by a lower right front proximal fastener 320 (FIG. 22) passing through the lower right front proximal end 312 and extending through the lower front right tab 148 of the suspension module 32 (FIGS. 6, 22 and 24). The lower right front proximal fastener 320 extends in the interior portion 164, above the bottom wall 138 of the suspension module 32. The lower right front proximal fastener 320 pivotally connects the lower right front member 308 to the suspension module 32 about a lower front right pivot axis 322 (FIG. 24). The lower front right pivot axis 322 extends through the interior portion 164, above the bottom wall 138 of the suspension module 32 (FIG. 26). Referring to FIGS. 22 and 24, a plate 323 is connected to the front portion 94 of the suspension module 32. The plate 323 is disposed forward of the lower front left and right tabs 146, 148 shown in FIG. 6. The plate 323 extends laterally and has holes defined therein for receiving the lower front left and right proximal fasteners 316, 320. It is contemplated that the plate 323 could also be welded to the suspension module 32.

Referring to FIGS. 24, 26 and 30, a distance 324 between the lower front left and right pivot axes 318, 322 is less than twice an outside diameter 325 of one of the lower front left proximal end 304 and the lower right front proximal end 312. As the lower front left proximal end 304 and the lower right front proximal end 312 are cylindrical, the outside diameter 325 is measured as shown in FIGS. 26 and 30.

Figure 25:
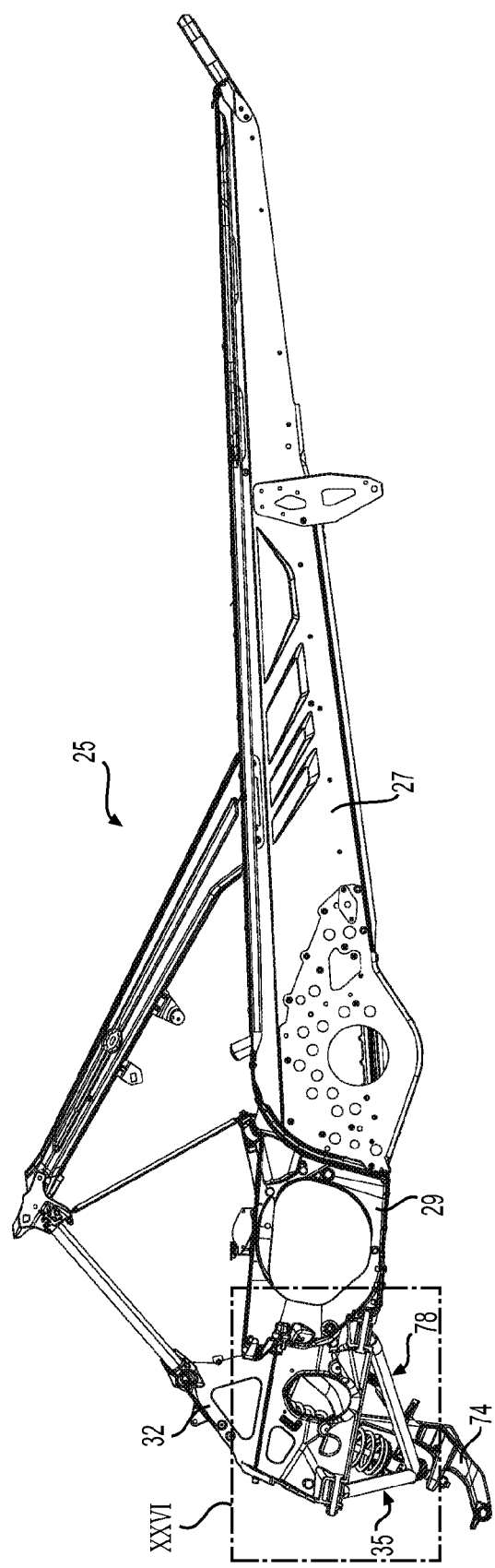
FIG. 25 is a cross-sectional view of the frame and front suspension assemblies of FIG. 18 taken along line XXV-XXV of FIG. 23.
Figure 28:
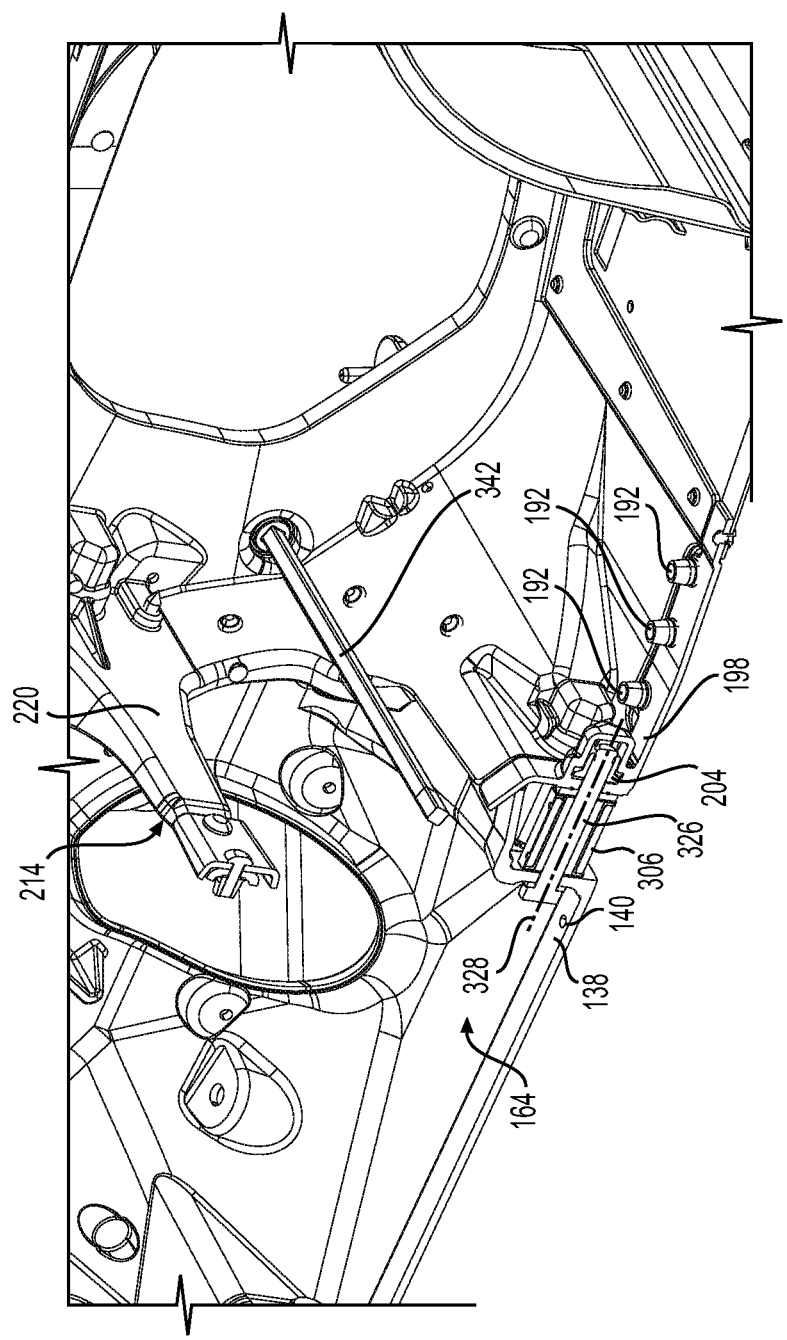
FIG. 28 is an enlarged view of the portion XVIII of the frame of FIG. 27.
Figure 29:
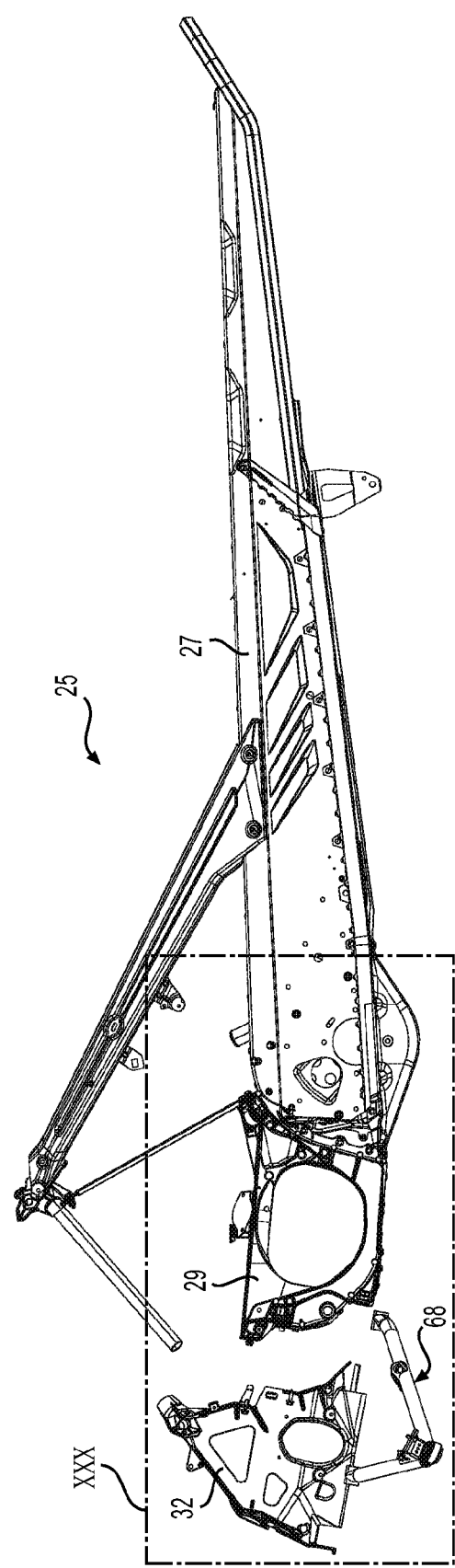
FIG. 29 is a partially exploded left side elevation view of the frame of FIG. 2, with a lower left suspension arm.

The lower left rear proximal end 306 is positioned longitudinally between the motor module 29 and the suspension module 32 (FIGS. 21 and 28 to 30). The lower left rear proximal end 306 is connected to the suspension module 32 and to the motor module 29 by a lower left rear proximal fastener 326 passing through the lower left rear proximal end 306 and extending in the interior portion 164, above the bottom wall 138 of the suspension module 32. More particularly, the lower left rear proximal fastener 326 extends from the interior portion 164 of the suspension module 32, through the hole 152 (FIG. 7), through the lower left rear proximal end 306, to the left bracket 198 through the hole 207 (FIG. 12A) and is fastened to the left nut 204. The lower left rear proximal fastener 326 pivotally connects the lower left rear member 302 to the suspension module 32 and to the motor module 29 about a lower rear left pivot axis 328. The lower rear left pivot axis 328 extends through the interior portion 164, above the bottom wall 138 of the suspension module 32 (FIG. 28). Similarly, the lower right rear proximal end 314 is positioned longitudinally between the motor module 29 and the suspension module 32 (FIGS. 21, 25 and 26). The lower right rear proximal end 314 is connected to the suspension module 32 and to the motor module 29 by a lower right rear proximal fastener 332 passing through the lower right rear proximal end 314 and extending in the interior portion 164, above the bottom wall 138 of the suspension module 32. More particularly, the lower right rear proximal fastener 332 extends from the interior portion 164 of the suspension module 32, through the hole 154 (FIG. 7), through the lower right rear proximal end 314, to the right bracket 200 through the hole 209 (FIG. 12A) and is fastened to the right nut 206. The lower right rear proximal fastener 332 pivotally connects the lower right rear member 310 to the suspension module 32 and to the motor module 29 about a lower rear right pivot axis 334. The lower rear right pivot axis 334 extends through the interior portion 164, above the bottom wall 138 of the suspension module 32 (FIG. 26).

The lower left rear proximal fastener 326 and the lower right rear proximal fastener 332 connect the corresponding lower left rear member 302 and lower right rear member 310 to the suspension module 32 and to the motor module 29. The lower left rear proximal fastener 326 and the lower right rear proximal fastener 332 also connect the suspension module 32 and the motor module 29 together.

Referring to FIG. 12A, the distance 236 corresponds to a distance between the lower left and right rear pivot axes 328, 334 (FIG. 24). The distance 236 is less than twice an outside diameter 330 (FIGS. 26 and 30) of one of the lower left and right rear proximal ends 306, 314. As the lower rear left proximal end 306 and the lower right rear proximal end 314 are cylindrical, the outside diameter 330 is measured as shown in FIGS. 26 and 30.

Referring to FIG. 24, the lower front and rear left pivot axes 318, 328 are coaxial. Similarly, the lower front and rear right pivot axes 322, 334 are coaxial. In addition, the lower front and rear left pivot axes 318, 328 are parallel to the lower front and rear right pivot axes 322, 334.

Referring to FIGS. 19, 24, 26 and 28, the snowmobile 20 further has a torsion bar assembly 340. The torsion bar assembly 340 includes a torsion bar 342. The torsion bar 342 extends across the motor module 29. A left end 344 of the torsion bar 342 is connected to an upper left linkage 346 which is connected to a lower left linkage 348. The lower left linkage 348 is connected to the lower left rear member 302. A right end 350 of the torsion bar 342 is connected to an upper right linkage 352 which is connected to a lower right linkage 354 (FIGS. 21 and 26). The lower right linkage 354 is connected to the lower right rear member 310.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
  a frame comprising:
    a motor module;
    a tunnel connected to the motor module; and
    a suspension module connected to the motor module, the suspension module having an interior portion;
  a motor received in the motor module;
  a handlebar connected to the frame;
  a ski operatively connected to the handlebar;
  an endless drive track operatively connected to the tunnel and to the motor;
  a front suspension assembly connected to the suspension module and to the motor module, the front suspension assembly connecting the ski to the suspension module and to the motor module, the front suspension assembly comprising:
    a suspension arm having a proximal end positioned longitudinally between the motor module and the suspension module, the proximal end pivoting about a pivot axis extending through the interior portion of the suspension module; and
    a proximal fastener passing through the proximal end of the suspension arm and extending from the interior portion of the suspension module to the motor module, the proximal fastener thereby pivotally connecting the suspension arm to the suspension module and to the motor module about the pivot axis.

2. The snowmobile according to claim 1, wherein:
  the motor module has a bracket provided on a bottom wall of the motor module;
  the bracket is adapted to receive a nut for fastening the proximal fastener thereto; and
  the proximal fastener is fastened to the nut.

3. The snowmobile according to claim 1, wherein:
  the suspension module is forward of the motor module;
  the suspension arm comprises a front member and a rear member; and
  the rear member has the proximal end.

4. The snowmobile according to claim 1, wherein:
  the ski is a front left ski;

the front suspension assembly is a front left suspension assembly;
the front left ski is operatively connected to the suspension module and to the motor module via the front left suspension assembly;
the suspension arm is a left suspension arm;
the proximal end is a left proximal end;
the pivot axis is a left pivot axis;
the proximal fastener is a left proximal fastener;
the snowmobile further comprises:
  a front right suspension assembly; and
  a front right ski operatively connected to the suspension module and to the motor module via the front right suspension assembly, the front right suspension assembly comprising:
    a right suspension arm having a right proximal end positioned longitudinally between the motor module and the suspension module, the right proximal end pivoting about a right pivot axis extending through the interior portion of the suspension module; and
    a right proximal fastener passing through the right proximal end of the right suspension arm and extending from the interior portion of the suspension module to the motor module, the right proximal fastener thereby pivotally connecting the right suspension arm to the suspension module and to the motor module about the right pivot axis.

5. The snowmobile according to claim 4, wherein a distance between the left and right pivot axes is less than twice an outside diameter of one of the left and right proximal ends.

6. The snowmobile according to claim 4, wherein:
the left suspension arm comprises a front left member and a rear left member, the rear left member has the left proximal end; and
the right suspension arm comprises a front right member and a rear right member, the rear right member has the right proximal end.

7. The snowmobile according to claim 6, further comprising a torsion bar assembly comprising:
a torsion bar extending across the interior portion of the suspension module;
a left linkage connecting a left end of the torsion bar to the rear left member; and
a right linkage connecting a right end of the torsion bar to the rear right member.

8. The snowmobile according to claim 6, wherein:
the left proximal end is a rear left proximal end;
the left pivot axis is a rear left pivot axis;
the left proximal fastener is a rear left proximal fastener;
the front left member has a front left proximal end positioned below a front portion of the suspension module;
  the front left proximal end pivots about a front left pivot axis extending through the interior portion of the suspension module;
the front left suspension assembly further comprises a front left proximal fastener passing through the front left proximal end of the front left member and extending in the interior portion of the suspension module, the front left proximal fastener thereby pivotally connecting the front left member to the front portion of the suspension module;
the right proximal end is a rear right proximal end;
the right pivot axis is a rear right pivot axis;
the right proximal fastener is a rear right proximal fastener;
the front right member has a front right proximal end positioned below the front portion of the suspension module;
  the front right proximal end pivots about a front right pivot axis extending through the interior portion of the suspension module; and
the front right suspension assembly further comprises a front right proximal fastener passing through the front right proximal end of the front right member and extending in the interior portion of the suspension module, the front right proximal fastener thereby pivotally connecting the front right member to the front portion of the suspension module.

9. The snowmobile according to claim 8, wherein a distance between the front left and right pivot axes is less than twice an outside diameter of one of the front left proximal end and the front right proximal end.

10. The snowmobile according to claim 8, wherein:
the front and rear left pivot axes are coaxial;
the front and rear right pivot axes are coaxial; and
the front and rear left pivot axes are parallel to the front and rear right pivot axes.

11. The snowmobile according to claim 4, wherein:
the motor module has a bracket extending from a bottom wall of the motor module;
the snowmobile further comprises:
  a left nut received in the bracket;
  the left proximal fastener is fastened to the left nut;
  a right nut received in the bracket; and
  the right proximal fastener is fastened to the right nut.

12. The snowmobile according to claim 11, wherein:
the bottom wall of the motor module has a convex bottom face;
the bracket comprises a vertical portion extending downwardly from the convex bottom face and perpendicularly to the left and right pivot axes; and
the bracket further comprises a horizontal portion extending rearwardly and perpendicularly to the vertical portion.

13. The snowmobile according to claim 4, further comprising:
a left shock absorber assembly connected between the left suspension arm and the suspension module; and
a right shock absorber assembly connected between the right suspension arm and the suspension module.

14. The snowmobile according to claim 4, wherein:
the left suspension arm is a lower left suspension arm;
the front left suspension assembly further has an upper left suspension arm;
  the upper left suspension arm has upper front and rear left members;
    the upper left rear member has an upper left rear proximal end;
the front left suspension assembly further has an upper left rear proximal fastener passing through the upper left rear proximal end and extending through the motor module, the upper left rear proximal fastener pivotally connecting the upper left rear member to the motor module;
the right suspension arm is a lower right suspension arm;
the front right suspension assembly further has an upper right suspension arm;
  the upper right suspension arm has upper front and rear right members;

the upper right rear member has an upper right rear proximal end; and the front right suspension assembly further has an upper right rear proximal fastener passing through the upper right rear proximal end and extending through the motor module, the upper right rear proximal fastener pivotally connecting the upper right rear member to the motor module.

15. The snowmobile according to claim 14, wherein:

the upper left front member has an upper left front proximal end;

the front left suspension assembly further has an upper left front proximal fastener passing through the upper left front proximal end and extending through the suspension module, the upper left front proximal fastener pivotally connecting the upper left front member to the suspension module;

the upper right front member has an upper right front proximal end; and the front right suspension assembly further has an upper right front proximal fastener passing through the upper right front proximal end and extending through the suspension module, the upper right front proximal fastener pivotally connecting the upper right front member to the suspension module.

16. The snowmobile according to claim 1, wherein:

the suspension module comprises a left part and a right part; and the left and right parts are connected together.

17. The snowmobile according to claim 1, wherein:

the motor module comprises a left part and a right part; and the left and right parts are connected together using at least one of bonding and fastening.

18. The snowmobile according to claim 17, wherein the left and right parts of the motor module are cast parts.

* * * * *